(12) United States Patent
Cole et al.

(10) Patent No.: US 8,845,877 B2
(45) Date of Patent: Sep. 30, 2014

(54) HETEROCYCLE CATALYZED ELECTROCHEMICAL PROCESS

(75) Inventors: Emily Barton Cole, Princeton, NJ (US); Andrew Bocarsly, Plainsboro, NJ (US)

(73) Assignee: Liquid Light, Inc., Monmouth Junction, NJ (US)

( * ) Notice: Subject to any disclaimer, the term of this patent is extended or adjusted under 35 U.S.C. 154(b) by 134 days.

(21) Appl. No.: 12/846,011

(22) Filed: Jul. 29, 2010

(65) Prior Publication Data

US 2011/0226632 A1   Sep. 22, 2011

Related U.S. Application Data

(60) Provisional application No. 61/315,564, filed on Mar. 19, 2010, provisional application No. 61/315,710, filed on Mar. 19, 2010.

(51) Int. Cl.
- C25B 3/00 (2006.01)
- C25B 3/04 (2006.01)
- C25B 1/00 (2006.01)
- C25B 3/10 (2006.01)

(52) U.S. Cl.
CPC . *C25B 3/04* (2013.01); *C25B 1/003* (2013.01); *C25B 3/105* (2013.01)
USPC ........................................................ 205/448

(58) Field of Classification Search
USPC ........................................................ 205/448
See application file for complete search history.

(56) References Cited

U.S. PATENT DOCUMENTS

| | | |
|---|---|---|
| 1,280,622 A | 10/1918 | Andrews |
| 3,019,256 A | 1/1962 | Dunn |
| 3,399,966 A | 9/1968 | Suzuki et al. |
| 3,401,100 A | 9/1968 | Macklin |
| 3,560,354 A | 2/1971 | Young |
| 3,607,962 A | 9/1971 | Krekeler et al. |
| 3,636,159 A | 1/1972 | Solomon |

(Continued)

FOREIGN PATENT DOCUMENTS

| | | |
|---|---|---|
| AU | 2012202601 A1 | 5/2012 |
| CA | 2604569 A1 | 10/2006 |

(Continued)

OTHER PUBLICATIONS

Harrison et al., "The Electrochemical Reduction of Organic Acids", Electroanalytical Chemistry and Interfacial Electrochemistry (no month, 1971), vol. 32, No. 1, pp. 125-135.*

(Continued)

*Primary Examiner* — Edna Wong
(74) *Attorney, Agent, or Firm* — Suiter Swantz pc llo

(57) ABSTRACT

A method for heterocycle catalyzed electrochemical reduction of a carbonyl compound is disclosed. The method generally includes steps (A) to (C). Step (A) may introduce the carbonyl compound into a solution of an electrolyte and a heterocycle catalyst in a divided electrochemical cell. The divided electrochemical cell may include an anode in a first cell compartment and a cathode in a second cell compartment. The cathode generally reduces the carbonyl compound to at least one aldehyde compound. Step (B) may vary which of the aldehyde compounds is produced by adjusting one or more of (i) a cathode material, (ii) the electrolyte, (iii) the heterocycle catalyst, (iv) a pH level and (v) an electrical potential. Step (C) may separate the aldehyde compounds from the solution.

11 Claims, 10 Drawing Sheets

(56) References Cited

U.S. PATENT DOCUMENTS

| | | |
|---|---|---|
| 3,720,591 A | 3/1973 | Skarlos |
| 3,745,180 A | 7/1973 | Rennie |
| 3,764,492 A | 10/1973 | Baizer et al. |
| 3,779,875 A * | 12/1973 | Michelet .................. 205/443 |
| 3,894,059 A | 7/1975 | Selvaratnam |
| 3,899,401 A | 8/1975 | Nohe et al. |
| 3,959,094 A | 5/1976 | Steinberg |
| 4,072,583 A | 2/1978 | Hallcher et al. |
| 4,088,682 A | 5/1978 | Jordan |
| 4,147,599 A | 4/1979 | O'Leary et al. |
| 4,160,816 A | 7/1979 | Williams et al. |
| 4,219,392 A * | 8/1980 | Halmann .................. 205/340 |
| 4,253,921 A | 3/1981 | Baldwin et al. |
| 4,343,690 A | 8/1982 | De Nora |
| 4,381,978 A | 5/1983 | Gratzel et al. |
| 4,414,080 A | 11/1983 | Williams et al. |
| 4,421,613 A * | 12/1983 | Goodridge et al. .......... 205/450 |
| 4,439,302 A | 3/1984 | Wrighton et al. |
| 4,450,055 A | 5/1984 | Stafford |
| 4,451,342 A | 5/1984 | Lichtin et al. |
| 4,460,443 A | 7/1984 | Somorjai et al. |
| 4,474,652 A | 10/1984 | Brown et al. |
| 4,476,003 A | 10/1984 | Frank et al. |
| 4,478,694 A | 10/1984 | Weinberg |
| 4,478,699 A | 10/1984 | Halmann et al. |
| 4,545,866 A | 10/1985 | De Nora et al. |
| 4,560,451 A | 12/1985 | Nielsen |
| 4,595,465 A | 6/1986 | Ang et al. |
| 4,608,132 A * | 8/1986 | Sammells .................. 205/440 |
| 4,608,133 A | 8/1986 | Morduchowitz et al. |
| 4,609,440 A | 9/1986 | Frese, Jr. et al. |
| 4,609,441 A | 9/1986 | Frese, Jr. et al. |
| 4,609,451 A | 9/1986 | Sammells et al. |
| 4,619,743 A * | 10/1986 | Cook ........................ 205/448 |
| 4,620,906 A | 11/1986 | Ang |
| 4,661,422 A | 4/1987 | Marianowski et al. |
| 4,668,349 A | 5/1987 | Cuellar et al. |
| 4,673,473 A | 6/1987 | Ang et al. |
| 4,702,973 A | 10/1987 | Marianowski |
| 4,732,655 A | 3/1988 | Morduchowitz et al. |
| 4,756,807 A | 7/1988 | Meyer et al. |
| 4,776,171 A | 10/1988 | Perry, Jr. et al. |
| 4,793,904 A | 12/1988 | Mazanec et al. |
| 4,824,532 A | 4/1989 | Moingeon et al. |
| 4,855,496 A | 8/1989 | Anderson et al. |
| 4,897,167 A | 1/1990 | Cook et al. |
| 4,902,828 A * | 2/1990 | Wickenhaeuser et al. .... 562/577 |
| 4,921,586 A | 5/1990 | Molter |
| 4,936,966 A | 6/1990 | Garnier et al. |
| 4,945,397 A | 7/1990 | Schuetz |
| 4,959,131 A | 9/1990 | Cook et al. |
| 5,064,733 A | 11/1991 | Krist et al. |
| 5,198,086 A | 3/1993 | Chlanda et al. |
| 5,246,551 A | 9/1993 | Pletcher et al. |
| 5,284,563 A | 2/1994 | Fujihira et al. |
| 5,290,404 A | 3/1994 | Toomey et al. |
| 5,294,319 A | 3/1994 | Kaczur et al. |
| 5,300,369 A | 4/1994 | Dietrich et al. |
| 5,382,332 A | 1/1995 | Fujihira et al. |
| 5,443,804 A | 8/1995 | Parker et al. |
| 5,474,658 A * | 12/1995 | Scharbert et al. ............ 205/443 |
| 5,514,492 A | 5/1996 | Marincic et al. |
| 5,536,856 A | 7/1996 | Harrison et al. |
| 5,587,083 A | 12/1996 | Twardowski |
| 5,763,662 A | 6/1998 | Ikariya et al. |
| 5,804,045 A | 9/1998 | Orillon et al. |
| 5,858,240 A | 1/1999 | Twardowski et al. |
| 5,928,806 A | 7/1999 | Olah et al. |
| 6,001,500 A | 12/1999 | Bass et al. |
| 6,024,935 A | 2/2000 | Mills et al. |
| 6,171,551 B1 | 1/2001 | Malchesky et al. |
| 6,187,465 B1 | 2/2001 | Galloway |
| 6,251,256 B1 | 6/2001 | Blay et al. |
| 6,270,649 B1 | 8/2001 | Zeikus et al. |
| 6,312,655 B1 | 11/2001 | Hesse et al. |
| 6,409,893 B1 | 6/2002 | Holzbock et al. |
| 6,492,047 B1 | 12/2002 | Peled et al. |
| 6,657,119 B2 | 12/2003 | Lindquist et al. |
| 6,755,947 B2 | 6/2004 | Schulze et al. |
| 6,777,571 B2 | 8/2004 | Chaturvedi et al. |
| 6,806,296 B2 | 10/2004 | Shiroto et al. |
| 6,881,320 B1 | 4/2005 | Krafton et al. |
| 6,887,728 B2 | 5/2005 | Miller et al. |
| 6,906,222 B2 | 6/2005 | Slany et al. |
| 6,936,143 B1 | 8/2005 | Graetzel et al. |
| 6,942,767 B1 | 9/2005 | Fazzina et al. |
| 6,949,178 B2 | 9/2005 | Tennakoon et al. |
| 7,037,414 B2 | 5/2006 | Fan |
| 7,052,587 B2 | 5/2006 | Gibson et al. |
| 7,094,329 B2 | 8/2006 | Saha et al. |
| 7,314,544 B2 | 1/2008 | Murphy et al. |
| 7,318,885 B2 | 1/2008 | Omasa |
| 7,338,590 B1 | 3/2008 | Shelnutt et al. |
| 7,361,256 B2 | 4/2008 | Henry et al. |
| 7,378,561 B2 | 5/2008 | Olah et al. |
| 7,704,369 B2 | 4/2010 | Olah et al. |
| 7,883,610 B2 * | 2/2011 | Monzyk et al. .............. 204/252 |
| 8,227,127 B2 | 7/2012 | Little et al. |
| 8,313,634 B2 | 11/2012 | Bocarsly et al. |
| 8,444,844 B1 | 5/2013 | Teamey et al. |
| 2001/0026884 A1 | 10/2001 | Appleby et al. |
| 2003/0029733 A1 | 2/2003 | Otsuka et al. |
| 2004/0089540 A1 | 5/2004 | Van Heuveln et al. |
| 2005/0011755 A1 | 1/2005 | Jovic et al. |
| 2005/0011765 A1 | 1/2005 | Omasa |
| 2005/0051439 A1 | 3/2005 | Jang |
| 2005/0139486 A1 | 6/2005 | Carson et al. |
| 2006/0102468 A1 | 5/2006 | Monzyk et al. |
| 2006/0235091 A1 | 10/2006 | Olah et al. |
| 2006/0243587 A1 | 11/2006 | Tulloch et al. |
| 2007/0004023 A1 | 1/2007 | Trachtenberg et al. |
| 2007/0012577 A1 | 1/2007 | Bulan et al. |
| 2007/0045125 A1 | 3/2007 | Hartvigsen et al. |
| 2007/0054170 A1 | 3/2007 | Isenberg |
| 2007/0122705 A1 | 5/2007 | Paulsen et al. |
| 2007/0184309 A1 | 8/2007 | Gust, Jr. et al. |
| 2007/0224479 A1 | 9/2007 | Tadokoro et al. |
| 2007/0231619 A1 | 10/2007 | Strobel et al. |
| 2007/0240978 A1 | 10/2007 | Beckmann et al. |
| 2007/0254969 A1 | 11/2007 | Olah et al. |
| 2007/0282021 A1 | 12/2007 | Campbell |
| 2008/0011604 A1 | 1/2008 | Stevens et al. |
| 2008/0039538 A1 | 2/2008 | Olah et al. |
| 2008/0060947 A1 | 3/2008 | Kitsuka et al. |
| 2008/0072496 A1 | 3/2008 | Yogev et al. |
| 2008/0090132 A1 | 4/2008 | Ivanov et al. |
| 2008/0116080 A1 | 5/2008 | Lal et al. |
| 2008/0145721 A1 | 6/2008 | Shapiro et al. |
| 2008/0223727 A1 | 9/2008 | Oloman et al. |
| 2008/0248350 A1 | 10/2008 | Little et al. |
| 2008/0283411 A1 | 11/2008 | Eastman et al. |
| 2008/0286643 A1 | 11/2008 | Iwasaki |
| 2008/0287555 A1 | 11/2008 | Hussain et al. |
| 2008/0296146 A1 | 12/2008 | Toulhoat et al. |
| 2009/0014336 A1 | 1/2009 | Olah et al. |
| 2009/0030240 A1 | 1/2009 | Olah et al. |
| 2009/0038955 A1 | 2/2009 | Rau |
| 2009/0057161 A1 | 3/2009 | Aulich et al. |
| 2009/0061267 A1 | 3/2009 | Monzyk et al. |
| 2009/0062110 A1 | 3/2009 | Koshino et al. |
| 2009/0069452 A1 | 3/2009 | Robota |
| 2009/0134007 A1 | 5/2009 | Solis Herrera |
| 2009/0277799 A1 | 11/2009 | Grimes |
| 2009/0308759 A1 | 12/2009 | Waycuilis |
| 2010/0069600 A1 | 3/2010 | Morelle et al. |
| 2010/0084280 A1 | 4/2010 | Gilliam et al. |
| 2010/0147699 A1 | 6/2010 | Wachsman et al. |
| 2010/0150802 A1 | 6/2010 | Gilliam et al. |
| 2010/0180889 A1 | 7/2010 | Monzyk et al. |
| 2010/0187123 A1 | 7/2010 | Bocarsly et al. |
| 2010/0187125 A1 | 7/2010 | Sandoval et al. |
| 2010/0191010 A1 | 7/2010 | Bosman et al. |
| 2010/0193370 A1 | 8/2010 | Olah et al. |
| 2010/0196800 A1 | 8/2010 | Markoski et al. |

(56) References Cited

U.S. PATENT DOCUMENTS

| | | |
|---|---|---|
| 2010/0213046 A1 | 8/2010 | Grimes et al. |
| 2010/0248042 A1 | 9/2010 | Nakagawa et al. |
| 2010/0282614 A1 | 11/2010 | Detournay et al. |
| 2010/0305629 A1 | 12/2010 | Lund et al. |
| 2010/0307912 A1 | 12/2010 | Zommer |
| 2011/0014100 A1 | 1/2011 | Bara et al. |
| 2011/0024288 A1 | 2/2011 | Bhavaraju et al. |
| 2011/0083968 A1 | 4/2011 | Gilliam et al. |
| 2011/0114501 A1 | 5/2011 | Teamey et al. |
| 2011/0114502 A1* | 5/2011 | Cole et al. ............ 205/414 |
| 2011/0114503 A1 | 5/2011 | Sivasankar et al. |
| 2011/0114504 A1* | 5/2011 | Sivasankar et al. ...... 205/455 |
| 2011/0143929 A1 | 6/2011 | Sato et al. |
| 2011/0186441 A1 | 8/2011 | LaFrancois et al. |
| 2011/0226632 A1 | 9/2011 | Cole et al. |
| 2011/0237830 A1 | 9/2011 | Masel |
| 2011/0318617 A1 | 12/2011 | Kirchev et al. |
| 2012/0018311 A1 | 1/2012 | Yotsuhashi et al. |
| 2012/0043301 A1 | 2/2012 | Arvin et al. |
| 2012/0132538 A1 | 5/2012 | Cole et al. |
| 2012/0199493 A1 | 8/2012 | Krafft et al. |
| 2012/0215034 A1 | 8/2012 | McFarland |
| 2012/0228147 A1 | 9/2012 | Sivasankar et al. |
| 2012/0277465 A1 | 11/2012 | Cole et al. |
| 2012/0292196 A1 | 11/2012 | Albrecht et al. |
| 2012/0295172 A1 | 11/2012 | Peled et al. |
| 2012/0298522 A1 | 11/2012 | Shipchandler et al. |
| 2012/0329657 A1 | 12/2012 | Eastman et al. |
| 2013/0062216 A1 | 3/2013 | Yotsuhashi et al. |
| 2013/0098772 A1 | 4/2013 | Bocarsly et al. |
| 2013/0105304 A1 | 5/2013 | Kaczur et al. |
| 2013/0105330 A1 | 5/2013 | Teamey et al. |
| 2013/0118907 A1 | 5/2013 | Deguchi et al. |
| 2013/0118911 A1 | 5/2013 | Sivasankar et al. |
| 2013/0134048 A1 | 5/2013 | Teamey et al. |
| 2013/0134049 A1 | 5/2013 | Teamey et al. |
| 2013/0140187 A1 | 6/2013 | Teamey et al. |
| 2013/0180863 A1 | 7/2013 | Kaczur et al. |
| 2013/0186771 A1 | 7/2013 | Zhai et al. |

FOREIGN PATENT DOCUMENTS

| | | | |
|---|---|---|---|
| CN | 102190573 A | 9/2011 | |
| DE | 1047765 A | 12/1958 | |
| DE | 2301032 A | 7/1974 | |
| EP | 0028430 A1 | 5/1981 | |
| EP | 0111870 B1 | 12/1983 | |
| EP | 0081982 B1 | 5/1985 | |
| EP | 0277048 B1 | 3/1988 | |
| EP | 0390157 B1 | 5/2000 | |
| EP | 2329875 A1 | 6/2011 | |
| FR | 853643 | 3/1940 | |
| FR | 2780055 A1 | 12/1999 | |
| GB | 1285209 A | 8/1972 | |
| JP | 62120489 A | 6/1987 | |
| JP | 64-015388 | 1/1989 | |
| JP | 07258877 A | 10/1995 | |
| JP | 2004344720 A | 12/2004 | |
| JP | 2006188370 A | 7/2006 | |
| JP | 2007185096 A | 7/2007 | |
| KR | 20040009875 A | 1/2004 | |
| WO | 9101947 A1 | 2/1991 | |
| WO | WO 9724320 A1 | 7/1997 | |
| WO | 9850974 A1 | 11/1998 | |
| WO | WO9850974 A1 | 11/1998 | |
| WO | WO 0015586 A1 | 3/2000 | |
| WO | WO0025380 A2 | 5/2000 | |
| WO | WO02059987 A3 | 8/2002 | |
| WO | WO 03004727 A2 * | 1/2003 | .............. C25B 3/00 |
| WO | WO 2004067673 A1 | 8/2004 | |
| WO | 2007041872 A1 | 4/2007 | |
| WO | WO 2007041872 A1 | 4/2007 | |
| WO | WO2007041872 A1 | 4/2007 | |
| WO | WO2007058608 A1 | 5/2007 | |
| WO | 2007/091616 A1 | 8/2007 | |
| WO | WO2007119260 A2 | 10/2007 | |
| WO | WO2008016728 A2 | 2/2008 | |
| WO | WO2008017838 A1 | 2/2008 | |
| WO | WO2008124538 A1 | 10/2008 | |
| WO | WO2009002566 A1 | 12/2008 | |
| WO | 2009108327 A1 | 9/2009 | |
| WO | WO2009145624 A1 | 12/2009 | |
| WO | WO2010010252 A2 | 1/2010 | |
| WO | WO2010042197 A1 | 4/2010 | |
| WO | WO2010088524 A2 | 8/2010 | |
| WO | WO2010138792 A1 | 12/2010 | |
| WO | WO2011010109 A1 | 1/2011 | |
| WO | WO2011068743 A2 | 6/2011 | |
| WO | 2011116236 A2 | 9/2011 | |
| WO | WO2011120021 A1 | 9/2011 | |
| WO | WO2011123907 A1 | 10/2011 | |
| WO | WO2011133264 A1 | 10/2011 | |
| WO | 2011160577 A1 | 12/2011 | |
| WO | 2012015921 A1 | 2/2012 | |
| WO | WO 2012046362 A1 | 4/2012 | |
| WO | 2012166997 A2 | 12/2012 | |

OTHER PUBLICATIONS

Chauhan et al., "Electro Reduction of Acetophenone in Pyridine on a D.M.E.", J. Inst. Chemists (India) [Jul. 1983], vol. 55, No. 4, pp. 147-148.*

Seshadri et al., "A New Homogeneous Electrocatalyst for the Reduction of Carbon Dioxide to Methanol at Low Overpotential", J. of Electroanalytical Chemistry (no month, 1994), vol. 372, pp. 145-150.*

Green et al., "Vapor-Liquid Equilibria of Formaldehyde-Methanol-Water", Industrial and Engineering Chemistry (Jan. 1955), vol. 47, No. 1, pp. 103-109.*

Scibioh et al., "Electrochemical Reduction of Carbon Dioxide: A Status Report", Proc Indian Natn Sci Acad (May 2004), vol. 70, A, No. 3, pp. 407-462.*

R.P.S. Chaplin and A.A. Wragg; Effects of Process Conditions and Electrode Material on Reaction Pathways for Carbon Dioxide Electroreduction with Particular Reference to Formate Formation; Journal of Applied Electrochemistry 33: pp. 1107-1123, 2003; © Kluwer Academic Publishers. Printed in the Netherlands.

Akahori, Iwanaga, Kato, Hamamoto, Ishii; New Electrochemical Process for $CO_2$ Reduction to from Formic Acid from Combustion Flue Gases; Electrochemistry; vol. 4; pp. 266-270.

Ali, Sato, Mizukawa, Tsuge, Haga, Tanaka; Selective formation of $HCO_2-$ and $C_2O_4^{2-}$—in electrochemical reduction of $CO_2$ catalyzed by mono- and di-nuclear ruthenium complexes; Chemistry Communication; 1998; Received in Cambridge, UK, Oct. 13, 1997; 7/07363A; pp. 249-250.

Wang, Maeda, Thomas, Takanabe, Xin, Carlsson, Domen, Antonietti; A metal-free polymeric photocatalyst for hydrogen production from water under visible light; Nature Materials; Published Online Nov. 9, 2008; www.nature.com/naturematerials; pp. 1-5.

Aresta and Dibenedetto; Utilisation of $CO_2$ as a Chemical Feedstock: Opportunities and Challenges; Dalton Transactions; 2007; pp. 2975-2992; © The Royal Society of Chemistry 2007.

B. Aurian-Blajeni, I. Taniguchi, and J. O'M. Bockris; Photoelectrochemical Reduction of Carbon Dioxide Using Polyaniline-Coated Silicon; J. Electroanal. Chem.; vol. 149; 1983; pp. 291-293; Elsevier Sequoia S.A., Lausanne, Printed in The Netherlands.

Azuma, Hashimoto, Hiramoto, Watanabe, Sakata; Electrochemical Reduction of Carbon Dioxide on Various Metal Electrodes in Low-Temperature Aqueous $KHCO_3$ Media; J. Electrochem. Soc., vol. 137, No. 6, Jun. 1990 © The Electrochemical Society, Inc.

Bandi and Kuhne; Electrochemical Reduction of Carbon Dioxide in Water: Analysis of Reaction Mechanism on Ruthenium—Titanium—Oxide; J. Electrochem. Soc., vol. 139, No. 6, Jun. 1992 © The Electrochemical Society, Inc.

Beley, Collin, Sauvage, Petit, Chartier; Photoassisted Electro-Reduction of $CO_2$ on p-GaAs in the Presence of Ni Cyclam; J. Electroanal. Chem. vol. 206, 1986, pp. 333-339, Elsevier Sequoia S.A., Lausanne, Printed in The Netherlands.

(56) References Cited

OTHER PUBLICATIONS

Benson, Kubiak, Sathrum, and Smieja; Electrocatalytic and homogeneous approaches to conversion of CO2 to liquid fuels; Chem. Soc. Rev., 2009, vol. 38, pp. 89-99, © The Royal Society of Chemistry 2009.

Taniguchi, Aurian-Blajeni, and Bockris; The Mediation of the Photoelectrochemical Reduction of Carbon Dioxide by Ammonium Ions; J. Electroanal. Chem., vol. 161, 1984, pp. 385-388, Elsevier Sequoia S.A., Lausanne—Printed in The Netherlands.

Bockris and Wass; The Photoelectrocatalytic Reduction of Carbon Dioxide; J. Electrochem. Soc., vol. 136, No. 9, Sep. 1989, pp. 2521-2528, © The Electrochemical Society, Inc.

Carlos R. Cabrera and Hector D. Abruna; Electrocatalysis of CO2 Reduction at Surface Modified Metallic and Semiconducting Electrodes; J. Electroanal. Chem. vol. 209, 1986, pp. 101-107, Elesevier Sequoia S.A., Lausanne—Printed in The Netherlands, © 1986 Elsevier Sequoia S.A.

D. Canfield and K.W. Frese, Jr.; Reduction of Carbon Dioxide to Methanol on n- and p-GaAs and p-InP. Effect of Crystal Face, Electrolyte and Current Density; Journal of the Electrochemical Society; Aug. 1983; pp. 1772-1773.

Huang, Lu, Zhao, Li, and Wang; The Catalytic Role of N-Heterocyclic Carbene in a Metal-Free Conversion of Carbon Dioxide into Methanol: A Computational Mechanism Study; J. Am. Chem. Soc. 2010, vol. 132, pp. 12388-12396, © 2010 American Chemical Society.

Arakawa, et al., Catalysis Research of Relevance to Carbon Management: Progress, Challenges, and Opportunities; Chem. Rev. 2001, vol. 101, pp. 953-996.

Cheng, Blaine, Hill, and Mann; Electrochemical and IR Spectroelectrochemical Studies of the Electrocatalytic Reduction of Carbon Dioxide by [Ir2(dimen)4]2+ (dimen = 1,8-Diisocyanomenthane), Inorg. Chem. 1996, vol. 35, pp. 7704-7708, © 1996 American Chemical Society.

Stephen K. Ritter; What Can We Do With Carbon Dioxide?, Chemical & Engineering News, Apr. 30, 2007, vol. 85, No. 18, pp. 11-17, http://pubs.acs.org/cen/coverstory/85/8518cover.html.

J. Beck, R. Johnson, and T. Naya; Electrochemical Conversion of Carbon Dioxide to Hydrocarbon Fuels, EME 580 Spring 2010, pp. 1-42.

Aydin and Koleli, Electrochemical reduction of CO2 on a polyaniline electrode under ambient conditions and at high pressure in methanol, Journal of Electroanalytical Chemistry vol. 535 (2002) pp. 107-112, www.elsevier.com/locate/jelechem.

Lee, Kwon, Machunda, and Lee; Electrocatalytic Recycling of CO2 and Small Organic Molecules; Chem. Asian J. 2009, vol. 4, pp. 1516-1523, © 2009 Wiley-VCH Verlag GmbH&Co. KGaA, Weinheim.

Etsuko Fujita, Photochemical CO2 Reduction: Current Status and Future Prospects, American Chemical Society's New York Section, Jan. 15, 2011, pp. 1-29.

Toshio Tanaka, Molecular Orbital Studies on the Two-Electron Reduction of Carbon Dioxide to Give Formate Anion, Memoirs of Fukui University of Technology, vol. 23, Part 1, 1993, pp. 223-230.

A. Bewick and G.P. Greener, The Electroreduction of CO2 to Glycollate on a Lead Cathode, Tetrahedron Letters No. 5, pp. 391-394, 1970, Pergamon Press, Printed in Great Britain.

Centi, Perathoner, Wine, and Gangeri, Electrocatalytic conversion of CO2 to long carbon-chain hydrocarbons, Green Chem., 2007, vol. 9, pp. 671-678, © The Royal Society of Chemistry 2007.

A. Bewick and G.P. Greener, The Electroreduction of CO2 to Malate on a Mercury Cathode, Tetrahedron Letters No. 53, pp. 4623-4626, 1969, Pergamon Press, Printed in Great Britain.

Eggins, Brown, McNeill, and Grimshaw, Carbon Dioxide Fixation by Electrochemical Reduction in Water to Oxalate and Glyoxylate, Tetrahedron Letters vol. 29, No. 8, pp. 945-948, 1988, Pergamon Journals Ltd., Printed in Great Britain.

Stephen K. Ritter, What Can We Do With Carbon Dioxide? Scientists are trying to find ways to convert the plentiful greenhouse gas into fuels and other value-added products, Chemical & Engineering News, Apr. 30, 2007, vol. 85, No. 18, pp. 11-17, http://pubs.acs.org/cen/coverstory/85/8518cover.html.

Toshio Tanaka, Molecular Orbital Studies on the Two-Electron Reduction of Carbon Dioxide to Give Formate Anion, Memoirs of Fukui University of Technology, vol. 23, Part 1, 1993, pp. 223-230.

Columbia, Crabtree, and Thiel; The Temperature and Coverage Dependences of Adsorbed Formic Acid and Its Conversion to Formate on Pt(111), J. Am. Chem. Soc., vol. 114, No. 4, 1992, pp. 1231-1237.

Brian R. Eggins and Joanne McNeill, Voltammetry of Carbon Dioxide, Part I. A General Survey of Voltammetry at Different Electrode Materials in Different Solvents, J. Electroanal. Chem., 148 (1983) 17-24, Elsevier Sequoia S.A., Lausanne—Printed in The Netherlands.

Varghese, Paulose, Latempa, and Grimes; High-Rate Solar Photocatalytic Conversion of CO2 and Water Vapor to Hydrocarbon Fuels; Nano Letters, 2009, vol. 9, No. 2, pp. 731-737.

Han, Chu, Kim, Song, and Kim; Photoelectron spectroscopy and ab initio study of mixed cluster anions of [(CO21-3(Pyridine)1-6: Formation of a covalently bonded anion core of (C5H5N—CO2), Journal of Chemical Physics, vol. 113, No. 2, Jul. 8, 2000, pp. 596-601.

Heinze, Hempel, and Beckmann; Multielectron Storage and Photo-Induced Electron Transfer in Oligonuclear Complexes Containing Ruthenium(II) Terpyridine and Ferrocene Building Blocks, Eur. J. Inorg. Chem. 2006, 2040-2050.

Lin and Frei, Bimetallic redox sites for photochemical CO2 splitting in mesoporous silicate sieve, C. R. Chimie 9 (2006) 207-213.

Heyduk, MacIntosh, and Nocera; Four-Electron Photochemistry of Dirhodium Fluorophosphine Compounds, J. Am. Chem. Soc. 1999, 121, 5023-5032.

Witham, Huang, Tsung, Kuhn, Somorjai, and Toste; Converting homogeneous to heterogeneous in electrophilic catalysis using monodisperse metal nanoparticles, Nature Chemistry, DOI: 10.1038/NCHEM.468, pp. 1-6, 2009.

Hwang and Shaka, Water Suppression That Works. Excitation Sculpting Using Arbitrary Waveforms and Pulsed Field Gradients, Journal of Magnetic Resonance, Series A 112, 275-279 (1995).

Weissermel and Arpe, Industrial Organic Chemistry, 3rd Edition 1997, Published jointly by VCH Verlagsgesellschaft mbH, Weinheim (Federal Republic of Germany) VCH Pubiishers, Inc., New York, NY (USA), pp. 1-481.

T. Iwasita, . C. Nart, B. Lopez and W. Vielstich; On the Study of Adsorbed Species at Platinum From Methanol, Formic Acid and Reduced Carbon Dioxide Via in Situ FT-ir Spectroscopy, Electrochimica Atca, vol. 37. No. 12. pp. 2361-2367, 1992, Printed in Great Britain.

Lackner, Grimes, and Ziock; Capturing Carbon Dioxide From Air; pp. 1-15.

Kang, Kim, Lee, Hong, and Moon; Nickel-based tri-reforming catalyst for the production of synthesis gas, Applied Catalysis, A: General 332 (2007) 153-158.

Kostecki and Augustynski, Electrochemical Reduction of CO2 at an Activated Silver Electrode, Ber. Bunsenges. Phys. Chem. 98, 1510-1515 (1994) No. I2 C VCH Verlagsgesellschaft mbH, 0-69451 Weinheim, 1994.

Kunimatsu and Kita; Infrared Spectroscopic Study of Methanol and Formic Acid Adsorrates on a Platinum Electrode, Part II. Role of the Linear CO(a) Derived From Methanol and Formic Acid in the Electrocatalytic Oxidation of CH,OH and HCOOH, J Electroanal Chem., 218 (1987) 155-172, Elsevier Sequoia S A , Lausanne—Printed in The Netherlands.

Li and Prentice, Electrochemical Synthesis of Methanol from CO2 in High-Pressure Electrolyte, J. Electrochem. Soc., vol. 144, No. 12, Dec. 1997 © The Electrochemical Society, Inc., pp. 4284-4288.

Lichter and Roberts, 15N Nuclear Magnetic Resonance Spectroscopy. XIII. Pyridine-15N1, Journal of the American Chemical Society 1 93:20 1 Oct. 6, 1971, pp. 5218-5224.

R.J.L. Martin, The Mechanism of the Cannizzaro Reaction of Formaldehyde, May 28, 1954, pp. 335-347.

Fujitani, Nakamura, Uchijima, and Nakamura; The kinetics and mechanism of methanol synthesis by hydrogenation of C02 over a Zn-deposited Cu(111surface, Surface Science 383 (1997) 285-298.

(56) References Cited

OTHER PUBLICATIONS

Richard S. Nicholson and Irving Shain, Theory of Stationary Electrode Polarography, Single Scan and Cyclic Methods Applied to Reversible, Irreversible, and Kinetic Systems, Analytical Chemistry, Vol. 36, No. 4, Apr. 1964, pp. 706-723.

Noda, Ikeda, Yamamoto, Einaga, and Ito; Kinetics of Electrochemical Reduction of Carbon Dioxide on a Gold Electrode in Phosphate Buffer Solutions; Bull. Chem. Soc. Jpn., 68, 1889-1895 (1995).

Joseph W. Ochterski, Thermochemistry in Gaussian, (c)2000, Gaussian, Inc., Jun. 2, 2000, 19 Pages.

Kotaro Ogura and Mitsugu Takagi, Electrocatalytic Reduction of Carbon Dioxide to Methanol, Part IV. Assessment of the Current-Potential Curves Leading to Reduction, J. Electroanal. Chem., 206 (1986) 209-216, Elsevier Sequoia S.A., Lausanne—Printed in The Netherlands.

Ohkawa, Noguchi, Nakayama, Hashimoto, and Fujishima; Electrochemical reduction of carbon dioxide on hydrogen-storing materials, Part 3. The effect of the absorption of hydrogen on the palladium electrodes modified with copper; Journal of Electroanalytical Chemistry, 367 (1994) 165-173.

Ohmstead and Nicholson, Cyclic Voltammetry Theory for the Disproportionation Reaction and Spherical Diffusion, Analytical Chemistry, vol. 41, No. 6, May 1969, pp. 862-864.

Shunichi Fukuzumi, Bioinspired Energy Conversion Systems for Hydrogen Production and Storage, Eur. J. Inorg. Chem. 2008, 1339-1345.

Angamuthu, Byers, Lutz, Spek, and Bouwman; Electrocatalytic $CO_2$ Conversion to Oxalate by a Copper Complex, Science, vol. 327, Jan. 15, 2010, pp. 313-315.

J- Fischer, Th. Lehmann, and E. Heitz; The production of oxalic acid from $CO_2$ and $H_2O$, Journal of Applied Electrochemistry 11 (1981) 743-750.

Rosenthal, Bachman, Dempsey, Esswein, Gray, Hodgkiss, Manke, Luckett, Pistorio, Veige, and Nocera; Oxygen and hydrogen photocatalysis by two-electron mixed-valence coordination compounds, Coordination Chemistry Reviews 249 (2005) 1316-1326.

Rudolph, Dautz, and Jager; Macrocyclic [N42-] Coordinated Nickel Complexes as Catalysts for the Formation of Oxalate by Electrochemical Reduction of Carbon Dioxide, J. Am. Chem. Soc. 2000, 122, 10821-10830.

D.A. Shirley, High-Resolution X-Ray Photoemission Spectrum of the Valence Bands of Gold, Physical Review B, vol. 5, No. 12, Jun. 15, 1972, pp. 4709-4714.

S.G. Sun and J. Clavilier, The Mechanism of Electrocatalytic Oxidation of Formic Acid on Pt (100) and Pt (111) in Sulphuric Acid Solution: An Emirs Study, J. Electroanal. Chem., 240 (1988) 147-159, Elsevier Sequoia S.A., Lausanne—Printed in The Netherlands.

Sun, Lin, Li, and Mu; Kinetics of dissociative adsorption of formic acid on Pt(100), Pt(610), Pt(210), and Pt(110) . single-crystal electrodes in perchloric acid solutions, Journal of Electroanalytical Chemistry, 370 (1994) 273-280.

Marek Szklarczyk, Jerzy Sobkowski and Jolanta Pacocha, Adsorption and Reduction of Formic Acid on p-Type Silicon Electrodes, J. Electroanal. Chem., 215 (1986) 307-316, Elsevier Sequoia S.A., Lausanne—Printed in The Netherlands.

Zhao, Fan, and Wang, Photo-catalytic $CO_2$ reduction using sol-gel derived titania-supported zinc-phthalocyanine, Journal of Cleaner Production 15 (2007) 1894-1897.

Tanaka and Ooyama, Multi-electron reduction of $CO_2$ via Ru-$CO_2$, -C(O)OH, -CO, -CHO, and -$CH_2OH$ species, Coordination Chemistry Reviews 226 (2002) 211-218.

Toyohara, Nagao, Mizukawa, and Tanaka, Ruthenium Formyl Complexes as the Branch Point in Two- and Multi-Electron Reductions of $CO_2$, Inorg. Chem. 1995, 34, 5399-5400.

Watanabe, Shibata, and Kato; Design of Ally Electrocatalysts for $CO_2$ Reduction, III. The Selective and Reversible Reduction of $CO_2$ on Cu Alloy Electrodes; J. Electrochem. Soc., vol. 138, No. 11, Nov. 1991, pp. 3382-3389.

Dr. Chao Lin, Electrode Surface Modification and its Application to Electrocatalysis, V. Catalytic Reduction of Carbon Dioxide to Methanol, Thesis, 1992, Princeton University, pp. 157-179.

Dr. Gayatri Seshadri, Part I. Electrocatalysis at modified semiconductor and metal electrodes; Part II. Electrochemistry of nickel and cadmium hexacyanoferrates, Chapter 2—The Electrocatalytic Reduction of $CO_2$ to Methanol at Low Overpotentials, 1994, Princeton University, pp. 52-85.

Hori, Kikuchi, and Suzuki; Production of CO and $CH_4$ in Electrochemical Reduction of $CO_2$ at Metal Electrodes in Aqueous Hydrogencarbonate Solution; Chemistry Letters, pp. 1695-1698, 1985. (C) 1985 The Chemical Society of Japan.

Jitaru, Lowy, M. Toma, B.C. Toma, Oniciu; Electrochemical reduction of carbon dioxide on flat metallic cathodes; Journal of Applied Electrochemistry 27 (1997) pp. 875-889, Reviews in Applied Electrochemistry No. 45.

Kaneco, Iwao, Iiba, Itoh, Ohta, and Mizuno; Electrochemical Reduction of Carbon Dioxide on an Indium Wire in a KOH/Methanol-Based Electrolyte at Ambient Temperature and Pressure; Environmental Engineering Science; vol. 16, No. 2, 1999, pp. 131-138.

Todoroki, Hara, Kudo, and Sakata; Electrochemical reduction of high pressure $CO_2$ at Pb, Hg and in electrodes in an aqueous $KHCO_3$ solution; Journal of Electroanalytical Chemistry 394 (1995) 199-203.

R.P.S. Chaplin and A.A. Wragg, Effects of process conditions and electrode material on reaction pathways for carbon dioxide electroreduction with particular reference to formate formation, Journal of Applied Electrochemistry 33: 1107-1123, 2003, Copyright 2003 Kluwer Academic Publishers. Printed in The Netherlands.

Kapusta and Hackerman; The Electroreduction of Carbon Dioxide and Formic Acid on Tin and Indium Electrodes, J. Electrochem. Doc.: Electrochemical Science and Technology, vol. 130, No. 3 Mar. 1983, pp. 607-613.

M. N. Mahmood, D. Masheder, and C. J. Harty; Use of gas-diffusion electrodes for high-rate electrochemical reduction of carbon dioxide. I. Reduction at lead, indium- and tin-impregnated electrodes; Journal of Applied Electrochemistry 17 (1987) 1159-1170.

Y. Hori, Electrochemical $CO_2$ Reduction on Metal Electrodes, Modern Aspects of Electrochemistry, No. 42, edited by C. Vayenas et al., Springer, New York, 2008, pp. 89-189.

Yoshio Hori, Hidetoshi Wakebe, Toshio Tsukamoto and Osamu Koga; Electrocatalytic Process of CO Selectivity in Electrochemical Reductionof $CO_2$ at Metal Electrodes in Aqueous Media; Electrochimica Acta, vol. 39, No. 11/12, pp. 1833-1839, 1994, Copyright 1994 Elsevier Science Ltd., Printed in Great Britain.

Noda, Ikeda, Oda, Imai, Maeda, and Ito; Electrochemical Reduction of Carbon Dioxide at Various Metal Electrodes in Aqueous Potassium Hydrogen Carbonate Solution; Bull. Chem. Soc. Jpn., 63, 2459-2462, 1990, Copyright 1990 The Chemical Society of Japan.

Azuma, Hashimoto, Hiramoto, Watanbe, and Sakata; Carbon dioxide reduction at low temperature on various metal electrodes; J. Electroanal. Chem., 260 (1989) 441-445, Elsevier Sequoia S.A., Lausanne—Printed in The Netherlands.

Vassiliev, Bagotzky, Khazova, and Mayorova; Electroreduction of Carbon Dioxide, Part II. The Mechanism of Reduction in Aprotic Solvents, J. Electroanal. Chem. 189 (1985) 295-309, Elsevier Sequoia S.A., Lausanne—Printed in The Netherlands.

Vassiliev, Bagotzky, Khazova, and Mayorova; Electroreduction of Carbon Dioxide, Part I. The Mechanism and Kinetics of Electroreduction of $CO_2$ in Aqueous Solutions on Metals with High and Moderate Hydrogen Overvoltages, J. Electroanal. Chem. 189 (1985) 271-294, Elsevier Sequoia S.A., Lausanne—Printed in The Netherlands.

Ikeda, Takagi, and Ito; Selective Formation of Formic Acid, Oxalic Acid, and Carbon Monoxide by Electrochemical Reduction of Carbon Dioxide, Bull. Chem. Soc. Jpn., 60, 2517-2522.

Shibata, Yoshida, and Furuya; Electrochemical Synthesis of Urea at Gas-Diffusion Electrodes, IV. Simultaneous Reduction of Carbon Dioxide and Nitrate Ions with Various Metal Catalysts; J. Electrochem. Soc., vol. 145, No. 7, Jul. 1998 The Electrochemical Society, Inc., pp. 2348-2353.

(56) References Cited

OTHER PUBLICATIONS

F. Richard Keene, Electrochemical and Electrocatalytic Reactions of Carbon Dioxide—Chapter 1: Thermodynamic, Kinetic, and Product Considerations in Carbon Dioxide Reactivity, Elsevier, Amsterdam, 1993, pp. 1-17.

Sammells and Cook, Electrochemical and Electrocatalytic Reactions of Carbon Dioxide—Chapter 7: Electrocatalysis and Novel Electrodes for High Rate CO2 Reduction Under Ambient Conditions, Elsevier, Amsterdam, 1993, pp. 217-262.

W.W. Frese, Jr., Electrochemical and Electrocatalytic Reactions of Carbon Dioxide—Chapter 6: Electrochemical Reduction of CO2 at Solid Electrodes, Elsevier, Amsterdam, 1993, pp. 145-215.

Halmann and Steinberg, Greenhouse gas carbon dioxide mitigation: science and technology—Chapter 11: Photochemical and Radiation-Induced Activation of CO2 in Homogeneous Media, CRC Press, 1999, pp. 391-410.

Halmann and Steinberg, Greenhouse gas carbon dioxide mitigation: science and technology—Chapter 12: Electrochemical Reduction of CO2, CRC Press, 1999, pp. 411-515.

Halmann and Steinberg, Greenhouse gas carbon dioxide mitigation: science and technology—Chapter 13: Photoelectrochemical Reduction of CO2, CRC Press, 1999, pp. 517-527.

Colin Oloman and Hui Li, Electrochemical Processing of Carbon Dioxide, ChemSusChem 2008, 1, 385-391, Copyright 2008 Wiley-VCH Verlag GmbH& Co. KGaA, Weinheim, www.chemsuschem.org.

Hui Li and Colin Oloman, Development of a continuous reactor for the electro-reduction of carbon dioxide to formate—Part 1: Process variables, Journal of Applied Electrochemistry (2006) 36:1105-1115, Copyright Springer 2006.

Hui Li and Colin Oloman, Development of a continuous reactor for the electro-reduction of carbon dioxide to formate—Part 2: Scale-up, J Appl Electrochem (2007) 37:1107-1117.

Hui Li and Colin Oloman, The electro-reduction of carbon dioxide in a continuous reactor, Journal of Applied Electrochemistry (2005) 35:955-965, Copyright Springer 2005.

PCT International Search Report dated Dec. 13, 2011, PCT/US11/45515, 2 pages.

Andrew P. Doherty, Electrochemical reduction of butraldehyde in the presence of CO2, Electrochimica Acta 47 (2002) 2963-2967, Copyright 2002 Elsevier Science Ltd.

Seshadri, Lin, and Bocarsly; A new homogeneous electrocatalyst for the reduction of carbon dioxide to methanol at low overpotential; Journal of Electroanalytical Chemistry, 372 (1994) 145-150.

PCT International Search Report dated Dec. 15, 2011, PCT/US11/45521, 2 pages.

Fan et al., Semiconductor Electrodes. 27. The p- and n-GaAs-N, N? - Dimet h yl-4,4'-bipyridinium System. Enhancement of Hydrogen Evolution on p-GaAs and Stabilization of n-GaAs Electrodes, Journal of the American Chemical Society, vol. 102, Feb. 27, 1980, pp. 1488-1492.

PCT International Search Report dated Jun. 23, 2010, PCT/US10/22594, 2 pages.

Emily Barton Cole and Andrew B. Bocarsly, Carbon Dioxide as Chemical Feedstock, Chapter 11—Photochemical, Electrochemical, and Photoelectrochemical Reduction of Carbon Dioxide, Copyright 2010 Wiley-VCH Verlag GmbH & Co. KGaA, Weinheim, 26 pages.

Barton Cole, Lakkaraju, Rampulla, Morris, Abelev, and Bocarsly; Using a One-Electron Shuttle for the Multielectron Reduction of CO2 to Methanol: Kinetic, Mechanistic, and Structural Insights; Mar. 29, 2010, 13 pages.

Morris, McGibbon, and Bocarsly; Electrocatalytic Carbon Dioxide Activation: The Rate-Determining Step of Pyridinium-Catalyzed CO2 Reduction; ChemSusChem 2011, 4, 191-196, Copyright 2011 Wiley-VCH Verlag GmbH& Co. KGaA, Weinheim.

Emily Barton Cole, Pyridinium-Catalyzed Electrochemical and Photoelectrochemical Conversion of CO2 to Fuels: A Dissertation Presented to the Faculty of Princeton University in Candidacy for the Degree of Doctor of Philosophy, Nov. 2009, pp. 1-141.

Barton, Rampulla, and Bocarsly; Selective Solar-Driven Reduction of CO2 to Methanol Using a Catalyzed p-GaP Based Photoelectrochemical Cell; Oct. 3, 2007, 3 pages.

Mostafa Hossain, Nagaoka, and Ogura; Palladium and cobalt complexes of substituted quinoline, bipyridine and phenanthroline as catalysts for electrochemical reduction of carbon dioxide; electrochimica Acta, vol. 42, No. 16, pp. 2577-2585, 1997.

Keene, Creutz, and Sutin; Reduction of Carbon Dioxide by TRIS(2,2'-Bipyridine)Cobalt(I), Coordination Chemistry Reviews, 64 (1995) 247-260, Elsevier Science Publishers B.V., Amsterdam—Printed in The Netherlands.

Aurian-Blajeni, Halmann, and Manassen; Electrochemical Measurements on the Photoelectrochemical Reduction of Aqueous Carbon Dioxide on p-Gallium Phosphide and p-Gallium Arsenide Semiconductor Electrodes, Solar Energy Materials 8 (1983) 425-440, North-Holland Publishing Company.

Tan, Zou, and Hu; Photocatalytic reduction of carbon dioxide into gaseous hydrocarbon using TiO2 pellets; Catalysis Today 115 (2006) 269-273.

Bandi and Kuhne, Electrochemical Reduction of Carbon Dioxide in Water: Analysis of Reaction Mechanism on Ruthenium—Titanium—Oxide, J. Electrochem. Soc., vol. 139, No. 6, Jun. 1992 (C) The Electrochemical Society, Inc., pp. 1605-1610.

B. Beden, A. Bewick and C. Lamy, A Study by Electrochemically Modulated Infrared Reflectance Spectroscopy of the Electrosorption of Formic Acid at a Platinum Electrode, J. Electroanal. Chem., 148 (1983) 147-160, Elsevier Sequoia S.A., Lausanne—Printed in The Netherlands.

Bell and Evans, Kinetics of the Dehydration of Methylene Glycol in Aqueous Solution, Proceedings of the Royal Society of London, Series A, Mathematical and Physical Sciences, vol. 291, No. 1426 (Apr. 26, 1966), pp. 297-323.

Bian, Sumi, Furue, Sato, Kolke, and Ishitani; A Novel Tripodal Ligand, Tris[(4'-methy1-2,2'-bipyridy1-4-yl)-methyl]carbinol and Its Trinuclear Rull/Rel Mixed-Metal Complexes: Synthesis, Emission Properties, and Photocatalytic CO2 Reduction; Inorganic Chemistry, vol. 47, No. 23, 2008, pp. 10801-10803.

T. Bundgaard, H. J. Jakobsen, and E. J. Rahkamaa; A High-Resolution Investigation of Proton Coupled and Decoupled 13C FT NMR Spectra of 15N-Pyrrole; Journal of Magnetic Resonance 19,345-356 (1975).

D. Canfield and K. W. Frese, Jr, Reduction of Carbon Dioxide to Methanol on n- and p-GaAs and p-InP. Effect of Crystal Face, Electrolyte and Current Density, Journal of the Electrochemical Society, vol. 130, No. 8, Aug. 1983, pp. 1772-1773.

Arakawa, et al., Catalysis Research of Relevance to Carbon Management: Progress, Challenges, and Opportunities, Chem. Rev. 2001, 101, 953-996.

Chang, Ho, and Weaver; Applications of real-time infrared spectroscopy to electrocatalysis at bimetallic surfaces, I. Electrooxidation of formic acid and methanol on bismuth-modified Pt(111) and Pt(100), Surface Science 265 (1992) 81-94.

S. Clarke and J. A. Harrison, The Reduction of Formaldehyde, Electroanalytical Chemistry and Interfacial Electrochemistry, J. Electroanal. Chem., 36 (1972), pp. 109-115, Elsevier Sequoia S.A., Lausanne Printed in The Netherlands.

Li, Markley, Mohan, Rodriguez-Santiago, Thompson, and Van Niekerk; Utilization of Carbon Dioxide From Coal-Fired Power Plant for the Production of Value-Added Products; Apr. 27, 2006, 109 pages.

Hara et al., "Electrochemical Reduction of Carbon Dioxide Under High Pressure on Various Electrodes in an Aqueous Electrolyte", Journal of Electroanalytical Chemistry (no month, 1995), vol. 391, pp. 141-147.

Yamamoto et al., "Production of Syngas Plus Oxygen From CO2 in a Gas-Diffusion Electrode-Based Electrolytic Cell", Electrochimica Acta (no month, 2002), vol. 47, pp. 3327-3334.

Seshadri et al., "A New Homogeneous Electrocatalyst for the Reduction of Carbon Dioxide to Menthanol at Low Overpotential", Journal of Electroanalytical Chemistry, 372 pp. 145-150, Jul. 8, 1994, figure 1; p. 146-147.

Doherty, "Electrochemical Reduction of Butyraldehyde in the Presence of CO2", Electrochimica Acta 47(2002) 2963-2967.

(56) References Cited

OTHER PUBLICATIONS

Udupa et al., "The Electrolytic Reduction of Carbon Dioxide to Formic Acid", Electrochimica Acta (no month, 1971), vol. 16, pp. 1593-1598.

Jitaru, Maria, "Electrochemical Carbon Dioxide Reduction"—Fundamental and Applied Topics (Review), Journal of the University of Chemical Technology and Metallurgy (2007), vol. 42, No. 4, pp. 333-344.

Sloop et al., "The Role of Li-ion Battery Electrolyte Reactivity in Performance Decline and Self-Discharge", Journal of Power Sources (no month, 2003), vols. 119-121, pp. 330-337.

Shibata, Masami, et al., "Electrochemical Synthesis of Urea at Gas-Diffusion Electrodes", J. Electrochem. Soc., vol. 145, No. 2, Feb. 1998, pp. 595-600, The Electrochemical Society, Inc.

Shibata, Masami, et al., "Simultaneous Reduction of Carbon Dioxide and Nitrate Ions at Gas-Diffusion Electrodes with Various Metallophthalocyanine Catalysts", From a paper presented at the 4th International Conference on Electrocatalysis: From Theory to Industrial Applications', Sep. 22-25, 2002, Como, Italy, Electrochimica Acta 48 (2003) 3959-3958.

Chauhan et al., "Electro Reduction of Acetophenone in Pyridine on a D.M.E.", J Inst. Chemists (India) [Jul. 1983], vol. 55, No. 4, pp. 147-148.

Hori et al, chapter on "Electrochemical $CO_2$ Reduction on Metal Electrodes," in the book Modern Aspects of Electrochemistry, vol. 42, pp. 106 and 107.

Jitaru, Lowy, Toma, Toma and Oniciu, "Electrochemical Reduction of Carbon Dioxide on Flat Metallic Cathodes," Journal of Applied Electrochemistry, 1997, vol. 27, p. 876.

Popic, Avramov, and Vukovic, "Reduction of Carbon Dioxide on Ruthenium Oxide and Modified Ruthenium Oxide Electrodes in 0.5M $NaHCO_3$," Journal of Electroanalytical Chemistry, 1997, vol. 421, pp. 105-110.

Eggins and McNeill, "Voltammetry of Carbon Dioxide. I. A General Survey of Voltammetry at Different Electrode Materials in Different Solvents," Journal of Electroanalytical Chemistry, 1983, vol. 148, pp. 17-24.

Kostecki and Augustynski, "Electrochemical Reduction of $CO_2$ at an Active Silver Electrode," Ber. Busenges. Phys. Chem., 1994, vol. 98, pp. 1510-1515.

Non-Final Office Action for U.S. Appl. No. 12/846,221, dated Nov. 21, 2012.

Non-Final Office Action for U.S. Appl. No. 12/846,011, dated Aug. 29, 2012.

Non-Final Office Action for U.S. Appl. No. 12/846,002, dated Sep. 11, 2012.

Non-Final Office Action for U.S. Appl. No. 12/845,995, dated Aug. 13, 2012.

Final Office Action for U.S. Appl. No. 12/845,995, dated Nov. 28, 2012.

Non-Final Office Action for U.S. Appl. No. 12/696,840, dated Jul. 9, 2012.

Non-Final Office Action for U.S. Appl. No. 13/472,039, dated Sep. 13, 2012.

DNV (Det Norske Veritas), Carbon Dioxide Utilization, Electrochemical Conversion of $CO_2$—Opportunities and Challenges, Research and Innovation, Position Paper, Jul. 2011.

Matthew R. Hudson, Electrochemical Reduction of Carbon Dioxide, Department of Chemistry, State University of New York at Potsdam, Potsdam New York 13676, pp. 1-15, Dec. 9, 2005.

Colin Oloman and Hui Li, Electrochemical Processing of Carbon Dioxide, ChemSusChem 2008, 1, 385-391, (c) 2008 Wiley-VCH Verlag GmbH& Co. KGaA, Weinheim, www.chemsuschem.org.

Jean-Marie Lehn and Raymond Ziessel, Photochemical generation of carbon monoxide and hydrogen by reduction of carbon dioxide and water under visible light irradiation, Proc. Natl. Acad. Sci. USA, vol. 79, pp. 701-704, Jan. 1982, Chemistry.

Azuma, Hashimoto, Hiramoto, Watanabe, and Sakata; Carbon dioxide reduction at low temperature on various metal electrodes, J. Electroanal. Chem., 260 (1989) 441-445, Elsevier Sequoia S.A., Lausanne—Printed in The Netherlands.

Goettmann, Thomas, and Antonietti; Metal-Free Activation of $CO_2$ by Mesoporous Graphitic Carbon Nitride; Angewandte Chemie; Angew. Chem. Int. Ed. 2007, 46, 2717-2720.

Yu B Vassiliev, V S Bagotzky, O.A. Khazova and NA Mayorova; Electroreduction of Carbon Dioxide Part II. The Mechanism of Reduction in Aprotic Solvents, J Electroanal. Chem, 189 (1985) 295-309 Elsevier Sequoia S.A. , Lausanne—Printed in The Netherlands.

Whipple, Finke, and Kenis; Microfluidic Reactor for the Electrochemical Reduction of Carbon Dioxide: The Effect of pH; Electrochemical and Solid-State Letters, 13 (9) B109-B111 (2010), 1099-0062/2010/13(9)/B109/3/$28.00 © The Electrochemical Society.

Zhai, Chiachiarelli, and Sridhar; Effects of Gaseous Impurities on the Electrochemical Reduction of $CO_2$ on Copper Electrodes; ECS Transactions, 19 (14) 1-13 (2009), 10.1149/1.3220175 © The Electrochemical Society.

R.D.L. Smith, P.G. Pickup, Nitrogen-rich polymers for the electrocatalytic reduction of $CO_2$, Electrochem. Commun. (2010), doi:10.1016/j.elecom.2010.10.013.

B.Z. Nikolic, H. Huang, D. Gervasio, A. Lin, C. Fierro, R.R. Adzic, and E.B. Yeager; Electroreduction of carbon dioxide on platinum single crystal electrodes: electrochemical and in situ FTIR studies; J. Electmanal. Chem., 295 (1990) 415-423; Elsevier Sequoia S.A., Lausanne.

Nogami, Itagaki, and Shiratsuchi; Pulsed Electroreduction of $CO_2$ on Copper Electrodes-II; J. Electrochem. Soc., vol. 141, No. 5, May 1994 © The Electrochemical Society, Inc., pp. 1138-1142.

Ichiro Oda, Hirohito Ogasawara, and Masatoki Ito; Carbon Monoxide Adsorption on Copper and Silver Electrodes during Carbon Dioxide Electroreduction Studied by Infrared Reflection Absorption Spectroscopy and Surface-Enhanced Raman Spectroscopy; Langmuir 1996, 12, 1094-1097.

Kotaro Ogura Kenichi Mine, Jun Yano, and Hideaki Sugihara; Electrocatalytic Generation of C2 and C3 Compounds from Carbon Dioxide on a Cobalt Complex-immobilized Dual-film Electrode; J . Chem. Soc., Chem. Commun., 1993, pp. 20-21.

Ohkawa, Noguchi, Nakayama, Hashimoto, and Fujishima; Electrochemical reduction of carbon dioxide on hydrogen-storing materials Part 3. The effect of the absorption of hydrogen on the palladium electrodes modified with copper; Journal of Electroanalytical Chemistry, 367 (1994) 165-173.

Sanchez-Sanchez, Montiel, Tryk, Aldaz, and Fujishima; Electrochemical approaches to alleviation of the problem of carbon dioxide accumulation; Pure Appl. Chem., vol. 73, No. 12, pp. 1917-1927, 2001, © 2001 IUPAC.

D. J. Pickett and K. S. Yap, A study of the production of glyoxylic acid by the electrochemical reduction of oxalic acid solutions, Journal of Applied Electrochemistry 4 (1974) 17-23, Printed in Great Britain, © 1974 Chapman and Hall Ltd.

Bruce A. Parkinson & Paul F. Weaver, Photoelectrochemical pumping of enzymatic $CO_2$ reduction, Nature, vol. 309, May 10, 1984, pp. 148-149.

Paul, Tyagi, Bilakhiya, Bhadbhade, Suresh, and Ramachandraiah; Synthesis and Characterization of Rhodium Complexes Containing 2,4,6-Tris(2-pyridyl)-1,3,5-triazine and Its Metal-Promoted Hydrolytic Products: Potential Uses of the New Complexes in Electrocatalytic Reduction of Carbon Dioxide; Inorg. Chem. 1998, 37, 5733-5742.

Furuya, Yamazaki, and Shibata; High performance Ru-Pd catalysts for $CO_2$ reduction at gas-diffusion electrodes, Journal of Electroanalytical Chemistry 431 (1997) 39-41.

Petit, Chartier, Beley, and Deville; Molecular catalysts in photoelectrochemical cells Study of an efficient system for the selective photoelectroreduction of $CO_2$: p-GaP or p-GaAs / Ni( cyclam) 2+, aqueous medium; J. Electroanal. Chem., 269 (1989) 267-281; Elsevier Sequoia S.A., Lausanne—Printed in The Netherlands.

Popic, Avramov-Ivic, and Vukovic; Reduction of carbon dioxide on ruthenium oxide and modified ruthenium oxide electrodes in 0.5 M $NaHCO_3$, Journal of Electroanalytical Chemistry 421 (1997) 105-110.

(56) References Cited

OTHER PUBLICATIONS

Whipple and Kenis, Prospects of CO2 Utilization via Direct Heterogeneous Electrochemical Reduction, J. Phys. Chem. Lett. 2010, 1, 3451-3458, © 2010 American Chemical Society.
P.A. Christensen & S.J. Higgins, Preliminary note The electrochemical reduction of CO2 to oxalate at a Pt electrode immersed in acetonitrile and coated with polyvinylalcohol/[Ni(dppm)2Cl2], Journal of Electroanalytical Chemistry, 387 (1995) 127-132.
Qu, Zhang, Wang, and Xie; Electrochemical reduction of CO2 on RuO2/TiO2 nanotubes composite modified Pt electrode, Electrochimica Acta 50 (2005) 3576-3580.
Jin, Gao, Jin, Zhang, Cao, ; Wei, and Smith; High-yield reduction of carbon dioxide into formic acid by zero-valent metal/metal oxide redox cycles; Energy Environ. Sci., 2011, 4, pp. 881-884.
Yu B Vassiliev, V S Bagotzky. N V Osetrova and A A Mikhailova; Electroreduction of Carbon Dioxide Part III. Adsorption and Reduction of CO2 on Platinum Metals; J Electroanal Chem. 189 (1985) 311-324, Elsevier Sequoia SA Lausanne—Printed in The Netherlands.
M. Gattrell, N. Gupta, and A. Co; A review of the aqueous electrochemical reduction of CO2 to hydrocarbons at copper; Journal of Electroanalytical Chemistry 594 (2006) 1-19.
Hoshi, Ito, Suzuki, and Hori; Preliminary note CO 2 Reduction on Rh single crystal electrodes and the structural effect; Journal of Electroanalytical Chemistry 395 (1995) 309-312.
Rudolph, Dautz, and Jager; Macrocyclic [N42−] Coordinated Nickel Complexes as Catalysts for the Formation of Oxalate by Electrochemical Reduction of Carbon Dioxide; J. Am. Chem. Soc. 2000, 122, 10821-10830, Published on Web Oct. 21, 2000.
Ryu, Andersen, and Eyring; The Electrode Reduction Kinetics of Carbon Dioxide in Aqueous Solution; The Journal of Physical Chemistry, vol. 76, No. 22, 1972, pp. 3278-3286.
Zhao, Jiang, Han, Li, Zhang, Liu, Hi, and Wu; Electrochemical reduction of supercritical carbon dioxide in ionic liquid 1-n-butyl-3-methylimidazolium hexafluorophosphate; J. of Supercritical Fluids 32 (2004) 287-291.
Schwartz, Cook, Kehoe, MacDuff, Patel, and Sammells; Carbon Dioxide Reduction to Alcohols using Perovskite-Type Electrocatalysts; J. Electrochem. Soc., vol. 140, No. 3, Mar. 1993 © The Electrochemical Society, Inc., pp. 614-618.
Ikeda, Takagi, and Ito; Selective Formation of Formic Acid, Oxalic Acid, and Carbon Monoxide by Electrochemical Reduction of Carbon Dioxide; Bull. Chem. Soc. Jpn., 60, 2517-2522 (1987) © 1987 The Chemical Society of Japan.
Shiratsuchi, Aikoh, and Nogami; Pulsed Electroreduction of CO2 on Copper Electrodes; J, Electrochem. Soc., vol. 140, No. 12, Dec. 1993 © The Electrochemical Society, Inc.
Centi & Perathoner; Towards Solar Fuels from Water and CO2; ChemSusChem 2010, 3, 195-208, © 2010 Wiley-VCH Verlag GmbH& Co. KGaA, Weinheim.
David P. Summers, Steven Leach and Karl W. Frese Jr.; The Electrochemical Reduction of Aqueous Carbon Dioxide to Methanol at Molybdenum Electrodes With Low Overpotentials; J Electroanal. Chem., 205 (1986) 219-232, Elsevier Sequoia S.A., Lausanne—Printed in The Netherlands.
Isao Taniguchi, Benedict Aurian-Blajeni and John O'M. Bockris; Photo-Aided Reduction of Carbon Dioxide to Carbon Monoxide; J. Electroanal. Chem, 157 (1983) 179-182, Elsevier Sequoia S.A., Lausanne—Printed in The Netherlands.
Isao Taniguchi, Benedict Aurian-Blajeni and John O'M. Bockris; The Mediation of the Photoelectrochemical Reduction of Carbon Dioxide by Ammonium Ions; J. Electroanal. Chem, 161 (1984) 385-388, Elsevier Sequoia S.A., Lausanne—Printed in The Netherlands.
Hiroshi Yoneyama, Kenji Sugimura and Susumu Kuwabata; Effects of Electrolytes on the Photoelectrochemical Reduction of Carbon Dioxide at Illuminated p-Type Cadmium Telluride and p-Type Indium Phosphide Electrodes in Aqueous Solutions; J. Electroanal. Chem., 249 (1988) 143-153, Elsevier Sequoia ,S.A., Lausanne—Printed in The Netherlands.

Whipple, Finke, and Kenis; Microfluidic Reactor for the Electrochemical Reduction of Carbon Dioxide: The Effect of pH; Electrochemical and Solid-State Letters, 13 (9) B109-B111 (2010).
YLB Vassiliev, V S Bagotzky, N V. Osetrov, O.A. Khazova and NA Mayorova; Electroreduction of Carbon Dioxide Part I. The Mechanism and Kinetics of Electroreduction of CO2 in Aqueous Solutions on Metals with High and Moderate Hydrogen Overvoltages; J Electroanal. Chem. 189 (1985) 271-294, Elsevier Sequoia SA , Lausanne—Printed in The Netherlands.
YLB Vassiliev, V S Bagotzky, N V. Osetrov, O.A. Khazova and NA Mayorova; Electroreduction of Carbon Dioxide Part II. The Mechanism of Reduction in Aprotic Solvents; J Electroanal. Chem. 189 (1985) 295-309, Elsevier Sequoia SA , Lausanne—Printed in The Netherlands.
Watanabe, Shibata, Kato, Azuma, and Sakata; Design of Alloy Electrocatalysts for C02 Reduction III. The Selective and Reversible Reduction of C02 on Cu Alloy Electrodes; J. Electrochem. Soc., vol. 138, No. 11, Nov. 1991 © The Electrochemical Society, Inc., pp. 3382-3389.
Soichiro Yamamura, Hiroyuki Kojima, Jun Iyoda and Wasaburo Kawai; Photocatalytic Reduction of Carbon Dioxide with Metal-Loaded SiC Powders; J. Eleciroanal. Chem., 247 (1988) 333-337, Elsevier Sequoia S.A., Lausanne—Printed in The Netherlands.
R. Piercy, N. A. Hampson; The electrochemistry of indium, Journal of Applied Electrochemistry 5 (1975) 1-15, Printed in Great Britain, © 1975 Chapman and Hall Ltd.
C. K. Watanabe, K. Nobe; Electrochemical behaviour of indium in H2S04, Journal of Applied Electrochemistry 6 (1976) 159-162, Printed in Great Britain, © 1976 Chapman and Hall Ltd.
Yumi Akahori, Nahoko Iwanaga, Yumi Kato, Osamu Hamamoto, and Mikita Ishii; New Electrochemical Process for CO2 Reduction to from Formic Acid from Combustion Flue Gases; Electrochemistry; vol. 72, No. 4 (2004), pp. 266- 270.
Hamamoto, Akahori, Goto, Kato, and Ishii; Modified Carbon Fiber Electrodes for Carbon Dioxide Reduction; Electrochemistry, vol. 72, No. 5 (2004), pp. 322-327.
S. Omanovicâ, M. Metikosï-Hukovic; Indium as a cathodic material: catalytic reduction of formaldehyde; Journal of Applied Electrochemistry 27 (1997) 35-41.
Hara, Kudo, and Sakata; Electrochemical reduction of carbon dioxide under high pressure on various electrodes in an aqueous electrolyte; Journal of Electroanalytical Chemistry 391 (1995) 141-147.
Cook, MacDuff, and Sammells; High Rate Gas Phase CO2 Reduction to Ethylene and Methane Using Gas Diffusion Electrodes, J. Electrochem. Soc., vol. 137, No. 2, pp. 607-608, Feb. 1990, © The Electrochemical Society, Inc.
Daube, Harrison, Mallouk, Ricco, Chao, Wrighton, Hendrickson, and Drube; Electrode-Confined Catalyst Systems for Use in Optical-to-Chemical Energy Conversion; Journal of Photochemistry, vol. 29, 1985, pp. 71-88.
Dewulf, Jin, and Bard; Electrochemical and Surface Studies of Carbon Dioxide Reduction to Methane and Ethylene at Copper Electrodes in Aqueous Solutions; J. Electrochem. Soc., vol. 136, No. 6, Jun. 1989, pp. 1686-1691, © The Electrochemical Society, Inc.
J. Augustynski, P. Kedzierzawski, and B. Jermann, Electrochemical Reduction of CO2 at Metallic Electrodes, Studies in Surface Science and Catalysis, vol. 114, pp. 107-116, © 1998 Elsevier Science B.V.
Sung-Woo Lee, Jea-Keun Lee, Kyoung-Hag Lee, and Jun-Heok Lim, Electrochemical reduction of CO and H2 from carbon dioxide in aqua-solution, Current Applied Physics, vol. 10, 2010, pp. S51-S54.
Andrew P. Abbott and Christopher A. Eardley, Electrochemical Reduction of CO2 in a Mixed Supercritical Fluid, J. Phys. Chem. B, 2000, vol. 104, pp. 775-779.
Matthew R. Hudson, Electrochemical Reduction of Carbon Dioxide, Dec. 9, 2005, pp. 1-15.
S. Kapusta and N. Hackerman, The Electroreduction of Carbon Dioxide and Formic Acid on Tin and Indium Electrodes, J. Electrochem. Soc.: Electrochemical Science and Technology, Mar. 1983, pp. 607-613.
M Aulice Scibioh and B Viswanathan, Electrochemical Reduction of Carbon Dioxide: A Status Report, Proc Indian Natn Sci Acad, vol. 70, A, No. 3, May 2004, pp. 1-56.

(56) References Cited

OTHER PUBLICATIONS

N. L. Weinberg, D. J. Mazur, Electrochemical hydrodimerization of formaldehyde to ethylene glycol, Journal of Applied Electrochemistry, vol. 21, 1991, pp. 895-901.

R.P.S. Chaplin and A.A. Wragg, Effects of process conditions and electrode material on reaction pathways for carbon dioxide electroreduction with particular reference to formate formation, Journal of Applied Electrochemistry vol. 33, pp. 1107-1123, 2003, © 2003 Kluwer Academic Publishers. Printed in The Netherlands.

M.N. Mahmood, D. Masheder, and C.J. Harty, Use of gas-diffusion electrodes for high-rate electrochemical reduction of carbon dioxide. I. Reduction at lead, indium- and tin-impregnated electrodes, Journal of Applied Electrochemistry, vol. 17, 1987, pp. 1159-1170.

Summers, Leach, and Frese, The Electrochemical Reduction of Aqueous Carbon Dioxide to Methanol at Molybdenum Electrodes with Low Overpotentials, J. Electroanal. Chem., vol. 205, 1986, pp. 219-232, Elseiver Sequoia S.A., Lausanne—Printed in The Netherlands.

Frese and Leach, Electrochemical Reduction of Carbon Dioxide to Methane, Methanol, and CO on Ru Electrodes, Journal of the Electrochemical Society, Jan. 1985, pp. 259-260.

Frese and Canfield, Reduction of $CO_2$ on n-GaAs Electrodes and Selective Methanol Synthesis, J. Electrochem. Soc.: Electrochemical Science and Technology, vol. 131, No. 11, Nov. 1984, pp. 2518-2522.

Shibata, Yoshida, and Furuya, Electrochemical Synthesis of Urea at Gas-Diffusion Electrodes, J. Electrochem. Soc., vol. 145, No. 2, Feb. 1998, © The Electrochemical Society, Inc., pp. 595-600.

Shibata and Furuya, Simultaneous reduction of carbon dioxide and nitrate ions at gas-diffusion electrodes with various metallophthalocyanine catalysts, Electrochimica Acta 48, 2003, pp. 3953-3958.

M. Gattrell, N. Gupta, and A. Co, A Review of the aqueous electrochemical reduction of $CO_2$ to hydrocarbons at copper, Journal of Electroanalytical Chemistry, vol. 594, 2006, pp. 1-19.

Mahmood, Masheder, and Harty; Use of Gas-Diffusion Electrodes for High-Rate Electrochemical Reduction of Carbon Dioxide. II. Reduction at Metal Phthalocyanine-impregnated Electrodes; Journal of Applied Electrochemistry, vol. 17, 1987, pp. 1223-1227.

Gennaro, Isse, Saveant, Severin, and Vianello; Homogeneous Electron Transfer Catalysis of the Electrochemical Reduction of Carbon Dioxide. Do Aromatic Anion Radicals React in an Outer-Sphere Manner?; J. Am. Chem. Soc., 1996, vol. 118, pp. 7190-7196.

J. Giner, Electrochemical Reduction of $CO_2$ on Platinum Electrodes in Acid Solutions, Electrochimica Acta, 1963, vol. 8, pp. 857-865, Pregamon Press Ltd., Printed in Northern Ireland.

John Leonard Haan, Electrochemistry of Formic Acid and Carbon Dioxide on Metal Electrodes with Applications to Fuel Cells and Carbon Dioxide Conversion Devices, 2010, pp. 1-205.

M. Halmann, Photoelectrochemical reduction of aqueous carbon dioxide on p-type gallium phosphide in liquid junction solar cells, Nature, vol. 275, Sep. 14, 1978, pp. 115-116.

H. Ezaki, M. Morinaga, and S. Watanabe, Hydrogen Overpotential for Transition Metals and Alloys, and its Interpretation Using an Electronic Model, Electrochimica Acta, vol. 38, No. 4, 1993, pp. 557-564, Pergamon Press Ltd., Printed in Great Britain.

K.S. Udupa, G.S. Subramanian, and H.V.K. Udupa, The Electrolytic Reduction of Carbon Dioxide to Formic Acid, Electrochimica Acta, 1971, vol. 16, pp. 1593-1598, Pergamon Press., Printed in Northern Ireland.

Ougitani, Aizawa, Sonoyama, and Sakata; Temperature Dependence of the Probability of Chain Growth for Hydrocarbon Formation by Electrochemical Reduction of $CO_2$, Bull. Chem. Soc. Jpn., vol. 74, pp. 2119-2122, 2001.

Furuya, Yamazaki, and Shibata; High performance Ru-Pd catalysts for $CO_2$ reduction at gas-diffusion electrodes, Journal of Electroanalytical Chemistry, vol. 431, 1997, pp. 39-41.

R. Hinogami, Y. Nakamura, S. Yae, and Y. Nakato; An Approach to Ideal Semiconductor Electrodes for Efficient Photoelectrochemical Reduction of Carbon Dioxide by Modification with Small Metal Particles, J. Phys. Chem. B, 1998, vol. 102, pp. 974-980.

Reda, Plugge, Abram, and Hirst; Reversible interconversion of carbon dioxide and formate by an electroactive enzyme, PNAS, Aug. 5, 2008, vol. 105, No. 31, pp. 10654-10658, www.pnas.org/cgi/doi/10.1073pnas.0801290105.

Hori, Yoshio; Suzuki, Shin, Cathodic Reduction of Carbon Dioxide for Energy Storage, Journal of the Research Institute for Catalysis Hokkaido University, 30(2): 81-88, 1983-02, http://hdl.handle.net/2115/25131.

Hori, Wakebe, Tsukamoto, and Koga; Electrocatalytic Process of CO Selectivity in Electrochemical Reduction of $CO_2$ at Metal Electrodes in Aqueous Media, Electrochimica Acta, vol. 39, No. 11/12, pp. 1833-1839, 1994, Copyright 1994 Elsevier Science Ltd.,Pergamon, Printed in Great Britain.

Hori, Kikuchi, and Suzuki; Production of CO and $CH_4$ in Electrochemical Reduction of $CO_2$ at Metal Electrodes in Aqueous Hydrogencarbonate Solution; Chemistry Letters, 1985, pp. 1695-1698, Copyright 1985 The Chemical Society of Japan.

Hori, Kikuchi, Murata, and Suzuki; Production of Methane and Ethylene in Electrochemical Reduction of Carbon Dioxide at Copper Electrode in Aqueous Hydrogencarbonate Solution; Chemistry Letters, 1986, pp. 897-898, Copyright 1986 The Chemical Society of Japan.

Hoshi, Suzuki, and Hori; Step Density Dependence of $CO_2$ Reduction Rate on Pt(S)-[n(111) × (111)] Single Crystal Electrodes, Electrochimica Acta, vol. 41, No. 10, pp. 1617-1653, 1996, Copyright 1996 Elsevier Science Ltd. Printed in Great Britain.

Hoshi, Suzuki, and Hori; Catalytic Activity of $CO_2$ Reduction on Pt Single-Crystal Electrodes: Pt(S)-[n(111)×(111)], Pt(S)-[n(111)×(100)], and Pt(S)-[n(100)×(111)], J. Phys. Chem. B, 1997, vol. 101, pp. 8520-8524.

Ikeda, Saito, Yoshida, Noda, Maeda, and Ito; Photoelectrochemical reduction products of carbon dioxide at metal coated p-GaP photocathodes in non-aqueous electrolytes, J. Electroanal. Chem., 260 (1989) pp. 335-345, Elsevier Sequoia S.A., Lausanne—Printed in The Netherlands.

Noda, Ikeda, Oda, Imai, Maeda, and Ito; Electrochemical Reduction of Carbon Dioxide at Various Metal Electrodes in Aqueous Potassium Hydrogen Carbonate Solution, Bull. Chem. Soc. Jpn., 63, pp. 2459-2462, 1990, Copyright 1990 The Chemical Society of Japan.

S.R. Narayanan, B. Haines, J. Soler, and T.I. Valdez; Electrochemical Conversion of Carbon Dioxide to Formate in Alkaline Polymer Electrolyte Membrane Cells, Journal of The Electrochemical Society, 158 (2) A167-A173 (2011).

Tooru Inoue, Photoelectrocatalytic reduction of carbon dioxide in aqueous suspensions of semiconductor powders, Nature, vol. 277, Feb. 22, 1979, pp. 637-638.

B. Jermann and J. Augustynski, Long-Term Activation of the Copper Cathode in the Course of $CO_2$ Reduction, Electrochimica Acta, vol. 39, No. 11/12, pp. 1891-1896, 1994, Elsevier Science Ltd., Printed in Great Britain.

Jitaru, Lowy, M. Toma, B.C. Toma, and L. Oniciu; Electrochemical reduction of carbon dioxide on flat metallic cathodes; Journal of Applied Electrochemistry 27 (1997) 875-889, Reviews in Applied Electrochemistry No. 45.

Maria Jitaru, Electrochemical Carbon Dioxide Reduction-Fundamental and Applied Topics (Review), Journal of the University of Chemical Technology and Metallurgy, 42, 4, 2007, 333-344.

Kaneco, Katsumata, Suzuki, and Ohta; Photoelectrocatalytic reduction of $CO_2$ in LiOH/methanol at metal-modified p-InP electrodes, Applied Catalysis B: Environmental 64 (2006) 139-145.

J.J. Kim, D.P. Summers, and K.W. Frese, Jr; Reduction of $CO_2$ and CO to Methane on Cu Foil Electrodes, J. Electroanal. Chem., 245 (1988) 223-244, Elsevier Sequoia S.A., Lausanne—Printed in The Netherlands.

Osamu Koga and Yoshio Hori, Reduction of Adsorbed CO on a Ni Electrode in Connection With the Electrochemical Reduction of $CO_2$, Electrochimica Acta, vol. 38, No. 10, pp. 1391-1394, 1993, Printed in Great Britain.

Breedlove, Ferrence, Washington, and Kubiak; A photoelectrochemical approach to splitting carbon dioxide for a manned mission to Mars, Materials and Design 22 (2001) 577-584, © 2001 Elsevier Science Ltd.

(56) References Cited

OTHER PUBLICATIONS

Simon-Manso and Kubiak, Dinuclear Nickel Complexes as Catalysts for Electrochemical Reduction of Carbon Dioxide, Organometallics 2005, 24, pp. 96-102, © 2005 American Chemical Society.

Kushi, Nagao, Nishioka, Isobe, and Tanaka; Remarkable Decrease in Overpotential of Oxalate Formation in Electrochemical C02 Reduction by a Metal-Sulfide Cluster, J. Chem. Soc., Chem. Commun., 1995, pp. 1223-1224.

Kuwabata, Nishida, Tsuda, Inoue, and Yoneyama; Photochemical Reduction of Carbon Dioxide to Methanol Using ZnS Microcrystallite as a Photocatalyst in the Presence of Methanol Dehydrogenase, J. Electrochem. Soc., vol. 141, No. 6, pp. 1498-1503, Jun. 1994, © The Electrochemical Society, Inc.

Seshadri et al., "A new homogeneous electrocatalyst for the reduction of carbon dioxide to methanol at low overpotential", Journal of Electroanalytical Chemistry and Interfacial Electro Chemistry, Elsevier, Amsterdam, NL, vol. 372, No. 1-2, Jul. 8, 1994, pp. 145-150.

Hossain et al., "Palladium and cobalt complexes of substituted quinoline, bipyridine and phenanthroline as catalysts for electrochemical reduction of carbon dioxide", Electrochimica Acta, Elsevier Science Publishers, vol. 42, No. 16, Jan. 1, 1997, pp. 2577-2585.

Fisher et al., "Electrocatalytic reduction of carbon dioxide by using macrocycles of nickel and cobalt", Journal of the American Chemical Society, vol. 102, No. 24, Sep. 1, 1980, pp. 7361-7363.

Ishida et al., Selective Formation of HC00—In the Electrochemical CO2 Reduction Catalyzed by URU(BPY)2(CO)2 3/4 2+ (BPY = 2,2'-Bipyridine), Journal of the Chemical Society, Chemical Communications, Chemical Society, Letchworth, GB, Jan. 1, 1987, pp. 131-132.

Zhao et al., "Electrochemical reduction of supercritical carbon dioxide in ionic liquid 1-n-butyl-3-methylimidazolium hexafluorophosphate", Journal of Supercritical Fluids, PRA Press, US, vol. 32, No. 1-3, Dec. 1, 2004, pp. 287-291.

Seshadri et al, "A new homogeneous catalyst for the reduction of carbon dioxide to methanol at low overpotential," Journal of Electroanalytical Chemistry, 372 (1994) 145-150.

Scibioh et al, "Electrochemical Reductin of Carbon Dioxide: A Status Report," Proc. Indian Natn Science Acad., 70, A, No. 3, May 2004, pp. 407-762.

Fukaya et al., "Electrochemical Reduction of Carbon Dioxide to Formate Catalyzed by Rh(bpy)3CI3", Kagaku Gijutsu Kenkyusho Hokoku (no month, 1986), vol. 81, No. 5, pp. 255-258. 1-page abstract only.

Li et al., "The Electro-Reduction of Carbon Dioxide in a Continuous Reactor", J. of Applied Electrochemistry (no month, 2005), vol. 35, pp. 955-965.

Kaneco et al., "Electrochemical Reduction of Carbon Dioxide to Ethylene with High Faradaic Efficiency at a Cu Electrode in CsOH/Methanol", Electrochimica Acta (no month, 1999), vol. 44, pp. 4701-4706.

Yuan et al., "Electrochemical Activation of Carbon Dioxide for Synthesis of Dimethyl Carbonate in an Ionic Liquid", Electrochimica Acta (no month, 2009), vol. 54, pp. 2912-2915.

U.S. Appl. No. 13/724,647, filed Dec. 21, 2012; Office Action mailed Oct. 17, 2013.

U.S. Appl. No. 13/787,481, filed Mar. 6, 2013; Office Action mailed Sep. 13, 2013.

U.S. Appl. No. 13/724,082, filed Dec. 21, 2012; Office Action mailed Aug. 12, 2013.

U.S. Appl. No. 13/724,522, filed Dec. 21, 2012; Office Action mailed Oct. 1, 2013.

U.S. Appl. No. 13/724,885, filed Dec. 21, 2012; Office Action mailed Aug. 21, 2013.

U.S. Appl. No. 13/724,231, filed Dec. 21, 2012; Office Action mailed Aug. 20, 2013.

Hori et al, chapter on "Electrochemical CO2 Reduction on Metal Electrodes," in the book "Modern Aspects of Electrochemistry," vol. 42, pp. 106 and 107.

Czerwinski et al, "Adsorption Study of CO2 on Reticulated vitreous carbon (RVC) covered with platinum," Analytical Letters, vol. 18, Issue 14 (1985), pp. 1717-1722.

Hammouche et al, Chemical Catalysis of Electrochemical Reactions. Homogeneous Catalysis of the Electrochemical Reduction of Carbon Dioxide by Iron ("0") Porphyrins. Role of the Addition of Magnesium Cations. J. Am. Chem. Soc. 1991, 113, 8455-8466.

Hossain et al., Palladium and Cobalt Complexes of Substituted Quinoline, Bipyridine and Phenanthroline as Catalysts for Electrochemical Reduction of Carbon Dioxide, Electrochimica Acta (no month, 1997), vol. 42, No. 16, pp. 2577-2785.

Seshardi G., Lin C., Bocarsly A.B., A new homogeneous electrocatalyst for the reduction of carbon dioxide to methanol at low overpotential, Journal of Electroanalytical Chemistry, 1994, 372, pp. 145-150.

Seshadri et al., A New Homogeneous Electrocatalyst for the Reduction of Carbon Dioxide to Methanol at Low Overpotential, Journal of Electroanalytical Chemistry, 372 (1994), 145-50.

Green et al., Vapor-Liquid Equilibria of Formaldehyde-Methanol-Water, Industrial and Engineering Chemistry (Jan. 1955), vol. 47, No. 1, pp. 103-109.

Scibioh et al, Electrochemical Reduction of Carbon Dioxide: A Status Report, Proc Indian Natn Sci Acad (May 2004), vol. 70, A, No. 3, pp. 407-462.

Gennaro et al., Homogeneous Electron Transfer Catalysis of the Electrochemical Reduction of Carbon Dioxide. Do Aromatic Anion Radicals React in an Outer-Sphere Manner?, J. Am. Chem. Soc. (no month, 1996), vol. 118, pp. 7190-7196.

Perez et al., Activation of Carbon Dioxide by Bicyclic Amidines, J. Org. Chem. (no month, 2004), vol. 69, pp. 8005-8011.

Zaragoza Dorwald, Side Reactions in Organic Synthesis, 2005, Wiley-VCH Verlag GmbH & Co. KGaA, Weinheim, Preface. p. IX.

Liansheng et al, Journal of South Central University Technology, Electrode Selection of Electrolysis with Membrane for Sodium Tungstate Solution, 1999, 6(2), pp. 107-110.

Mahmood et al., Use of Gas-Diffusion Electrodes for High-Rate Electrochemical Reduction of Carbon Dioxide. II. Reduction at Metal Phthalocyanine-Impregnated Electrodes, J. of Appl. Electrochem. (no month, 1987), vol. 17, pp. 1223-1227.

Tanno et al., Electrolysis of Iodine Solution in a New Sodium Bicarbonate-Iodine Hybrid Cycle, International Journal of Hydrogen Energy (no month, 1984), vol. 9, No. 10, pp. 841-848.

James Grimshaw, Electrochemical Reactions and Mechanisms in Organic Chemistry, 2000, ISBN 978-0-444-72007-8. [retrieved on Jan. 3, 2014]. Retrieved from the Internet. <URL: http://f3.tiera.ru/ShiZ/Great%20Science%20TextBooks/Great%Science%20Textbooks%20DVD%20Library%202007%20-%20Supplement%20Five/Chemistry/Organic%20Chemistry/Electrochemical%20Reactions%20and%20Mechanisms%20in%20Organic%20Chemistry%20-%20J.%20Grimshaw%20%28Elsevier,%202000%29%WW.pdf>.

Fischer, J. et al. "The production of oxalic acid from CO2 and H2O." Journal of Applied Electrochemistry, 1981, vol. 11, pp. 743-750.

Goodridge, F. et al., The electrolytic reduction of carbon dioxide and monoxide for the production of carboxylic acids.: Journal of applied electrochemistry, 1984, vol. 14, pp. 791-796.

Chen et al., "Tin oxide dependence of the CO2 reduction efficiency on tin electrodes and enhanced activity for tin/tin oxide thin-film catalysts." Journal of the American Chemical Society 134, No. 4 (2012): 1986-1989, Jan. 9, 2012, retrieved on-line.

Zhou et al. "Anodic passivation processes of indium in alkaline solution [J]" Journal of Chinese Society for Corrosion and Protection 1 (2005): 005, Feb. 2005.

Fukaya et al., "Electrochemical Reduction of Carbon Dioxide to Formate Catalyzed by Rh(bpy)3CI3", Kagaku Gijutsu Kenkyusho Hokoku (no month, 1986), vol. 81, No. 5, pp. 255-258.

Shibata et al., "Electrochemical Synthesis of Urea at Gas-Diffusion Electrodes Part VI. Simultaneous Reduction of Carbon Dioxide and Nitrite Ions with Various Metallophthalocyanine Catalysts". J. of Electroanalytical Chemistry (no month, 2001), vol. 507, pp. 177-184.

Jaaskelainen and Haukka, The Use of Carbon Dioxide in Ruthenium Carbonyl Catalyzed 1-hexene Hydroformylation Promoted by Alkali Metal and Alkaline Earth Salts, Applied Catalysis A: General, 247, 95-100 (2003).

(56) References Cited

OTHER PUBLICATIONS

Heldebrant et al., "Reversible Zwitterionic Liquids, The Reaction of Alkanol Guanidines, Alkanol Amidines, and Diamines wih CO2", Green Chem. (mo month, 2010), vol. 12, pp. 713-721.

Perez et al., "Activation of Carbon Dioxide by Bicyclic Amidines", J. Org. Chem. (no month, 2004), vol. 69, pp. 8005-8011.

Kaneco et al., "Electrochemical Conversion of Carbon Dioxide to Formic Acid on Pb in KOH/Methanol Electrolyte at Ambient Temperature and Pressure", Energy (no month, 1998), vol. 23, No. 12, pp. 1107-1112.

Wu et al., "Electrochemical Reduction of Carbon Dioxide I. Effects of the Electrolyte on the Selectivity and Activity with Sn Electrode", Journal of the Electrochemical Society (no month, 2012), vol. 159, No. 7, pp. F353-F359.

Chaplin et al., "Effects of Process Conditions and Electrode Material on Reaction Pathways for Carbon Dioxide Electroreduction with Particular Reference to Formate Formation", Journal of Applied Electrochemistry (no month, 2003), vol. 33, pp. 1107-1123.

Jaime-Ferrer et al., "Three-Compartment Bipolar Membrane Electrodialysis for Splitting of Sodium Formate into Formic Acid and Sodium Hydroxide: Role of Diffusion of Molecular Acid", Journal of Membrane Science (no month, 2008), vol. 325, pp. 528-536.

Shibata et al., "Simultaneous Reduction of Carbon Dioxide and Nitrate Ions at Gas-Diffusion Electrodes with Various Metallophthalocyanine Catalysts", Electrochima Acta (no month, 2003), vol. 48, pp. 3953-3958.

Shibata et al., "Electrochemical Synthesis of Urea at Gas-Diffusion Electrodes", J. Electrochem. Soc. (Jul. 1998), vol. 145, No. 7, pp. 2348-2353.

Non-Final Office Action for U.S. Appl. No. 12/875,227, dated Dec. 11, 2012.

* cited by examiner (1) $C_2H_4O + C_2H_4O \rightarrow C_4H_8O + 1/2\ O_2$ (2) $C_2H_4O + C_2H_4O + 2H^+ \rightarrow C_4H_9OH + 1/2\ O_2$ (3) $C_4H_8O_2 + C_4H_8O_2 + 2H^+ \rightarrow C_8H_{18}O + 3/2\ O_2$ (4) $C_4H_8O_2 + C_4H_8O_2 \rightarrow C_8H_{16}O + 3/2\ O_2$

FIG. 3

REDUCTION / DIMERIZATION

| FEEDSTOCK | CATALYST | E (V vs SCE) | MeOH | EtOH | ACETONE | 2 BUTANOL | OTHER C4 | PROPIOIN |
|---|---|---|---|---|---|---|---|---|
| FORMIC ACID | 4,4' BIPY | -1.15 | 100% | | | | | |
| FORMIC ACID | 4,4' BIPY | -1.35 | 100% | | | | | |
| GLYOXAL | 4,4' BIPY | -1.17 | | | | 100% | | |
| GLYOXAL | 4,4' BIPY | -1.35 | | | | 100% | | |
| ACETIC ACID | 4,4' BIPY | -1.15 | | | | 100% | | |
| ACETIC ACID | 4,4' BIPY | -1.35 | | | | 100% | | |
| ACETALDEHYDE | 4,4' BIPY | -1.17 | | 50% | | 50% | | |
| ACETALDEHYDE | 4,4' BIPY | -1.38 | | 41% | | 58% | 1% N-BUTANOL | |
| LACTIC ACID | 4,4' BIPY | -1.35 | | | TRACE | | | >99% |

FIG. 4

HETEROCYCLE CATALYZED ELECTROCHEMICAL PROCESS

CROSS REFERENCE TO RELATED APPLICATIONS

This application claims benefit to U.S. Provisional Application Ser. No. 61/315,564, filed Mar. 19, 2010 and U.S. Provisional Application Ser. No. 61/315,710, filed Mar. 19, 2010, which are hereby incorporated by reference in their entirety.

FIELD OF THE INVENTION

The present invention relates to electrochemical processing generally and, more particularly, to a method and/or apparatus for implementing a heterocycle catalyzed electrochemical process.

BACKGROUND OF THE INVENTION

Alcohols and organic chemicals with hydroxyl and carbonyl functional groups are important to industrial processes and the production of light alcohol fuels. At present, several different processes are used for production of alcohols. Most alcohols are produced from oil or natural gas, while some including ethanol and pentanol are produced biologically. Hydroxyl groups are often introduced to organic molecules via catalytic hydrogenation of aldehydes or acid catalyzed hydration of alkenes. Some specific examples include methanol, which is produced by catalytic conversion of synthesis gas at high temperature and pressure. Ethanol is produced by acid catalyzed hydration of ethylene or by various microorganisms via fermentation of sugars.

Two major processes exist for propanol production. Acid catalyzed hydration of propylene is performed, resulting in a mixture of both isopropanol and n-propanol. Another process to make n-propanol is hydroformylation of ethylene to propionaldehyde followed by catalytic hydrogenation of propionaldehyde to n-propanol. N-butanol is produced in a manner similar to that of n-propanol. Propylene is converted to butyraldehyde via hydroformylation. The butyraldehyde is then catalytically hydrogenated to n-butanol. Sec-butanol is produced in a manner similar to ethanol, by the acid catalyzed hydration of 1-butene or 2-butene. Isomers of pentanol are primarily produced by the distillation of fusel oil. Fusel oil is a product of some biological fermentation processes. Hexanol and higher order alcohols are commonly produced by oligomerization of ethylene, which results in a mix of different products separated via distillation.

At present, many different techniques are currently used to create other organic products. Biological processes, such as fermentation of sugars, produce ethanol or fusel oil. The Fischer-Tropsch process is used for conversion of synthesis gases to organic molecules. Hydroformylation of alkenes is followed by catalytic hydrogenation to alcohols or alkanes. Polymerization of alkenes results in organic products. Electrochemical hydrodimerization of alkenes, notably the Monsanto process, produces adiponitrile.

Existing electrochemical and photochemical processes/systems have one or more of the following problems that prevent commercialization on a large scale. Selectively producing some alcohols, notably isopropanol, butanol, pentanol, and higher order alcohols is difficult. Selectively reducing carboxyl or carbonyl groups is also difficult without undesirable side reactions such as hydrogenation of aromatic molecules or heterocycles. Many existing processes, notably the Fischer-Tropsch process, make multiple products that are subsequently separated. Production of some aldehydes and alcohols use multi-step reactions that collectively have low energy efficiency. Likewise, hydrodimerization without a catalyst can be very inefficient. Existing reaction pathways use high heat, high temperature and/or highly acid environments. The heat conditions result in the use of expensive materials for the reactors. Many existing processes, both thermally and electrochemically driven, also use alkenes as a starting material.

SUMMARY OF THE INVENTION

The present invention concerns a method for heterocycle catalyzed electrochemical reduction of a carbonyl compound. The method generally includes steps (A) to (C). Step (A) may introduce the carbonyl compound into a solution of an electrolyte and a heterocycle catalyst in a divided electrochemical cell. The divided electrochemical cell may include an anode in a first cell compartment and a cathode in a second cell compartment. The cathode generally reduces the carbonyl compound to at least one aldehyde compound. Step (B) may vary which of the aldehyde compounds is produced by adjusting one or more of (i) a cathode material, (ii) the electrolyte, (iii) the heterocycle catalyst, (iv) a pH level and (v) an electrical potential. Step (C) may separate the aldehyde compounds from the solution.

The objects, features and advantages of the present invention include providing a method and/or apparatus for implementing a heterocycle catalyzed electrochemical process that may (i) reduce carbonyl groups to aldehydes, (ii) reduce aldehydes to alcohols, (iii) reduce keto groups to hydroxyl groups, (iv) support heterocycle catalyzed electrochemical processing at a commercial level, (v) operate at atmospheric pressure, (vi) operate at ambient temperature, (vii) use water as a solvent, (viii) process at a mild pH, (ix) selectively electrohydrodimerize carbonyl-containing compounds to a variety of organic chemicals and/or (x) provide stable processing over time.

BRIEF DESCRIPTION OF THE DRAWINGS

These and other objects, features and advantages of the present invention will be apparent from the following detailed description and the appended claims and drawings in which:

FIG. 3 are formulae of example hydrodimerization reactions;

FIG. 4 is a table illustrating relative product yields for different cathode material, catalyst and cathode potential combinations;

DETAILED DESCRIPTION OF THE PREFERRED EMBODIMENTS

Figure 1:
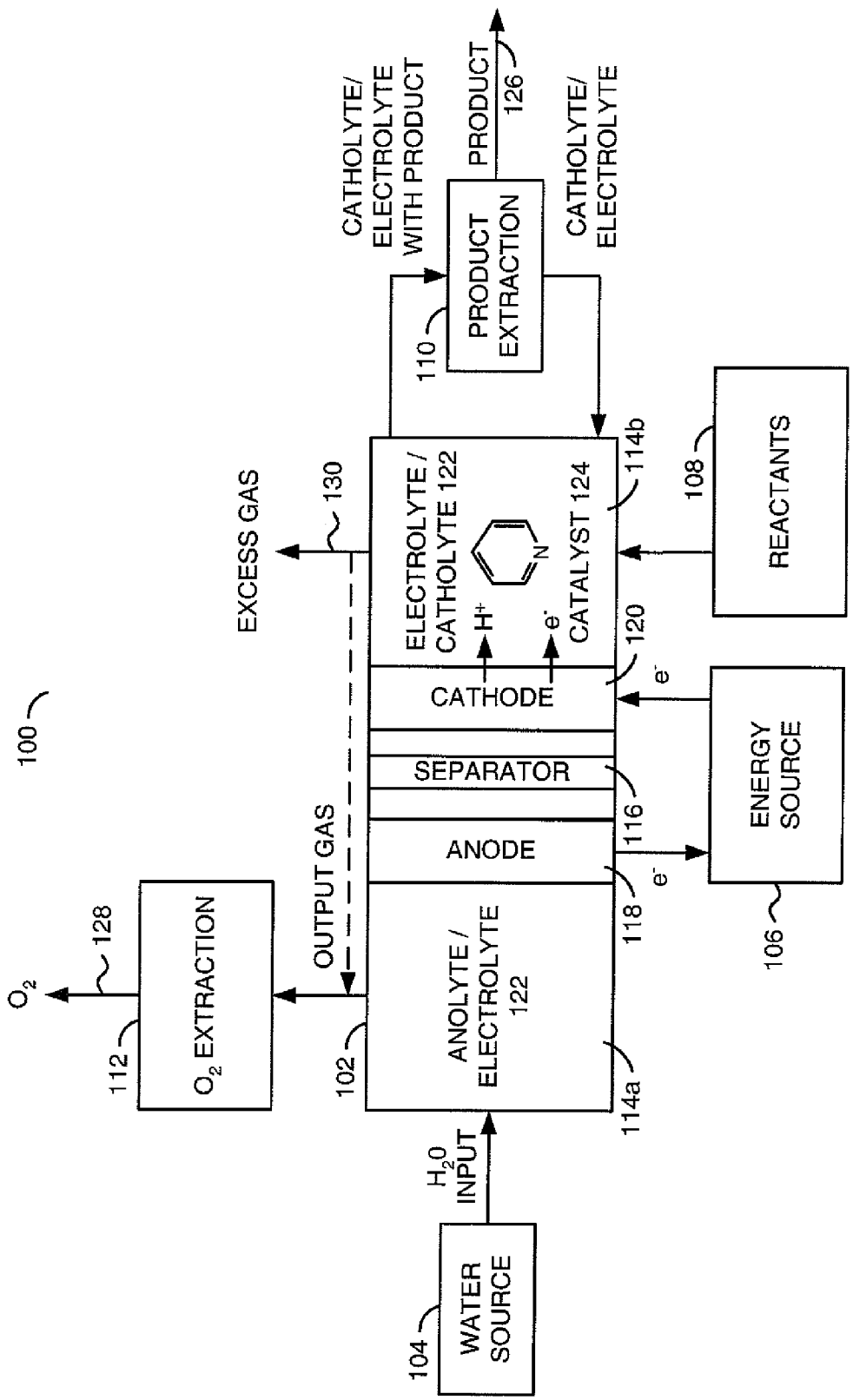
FIG. 1 is a block diagram of a system in accordance with a preferred embodiment of the present invention.

Some embodiments of the present invention relate to heterocycle catalyzed reduction of keto groups to hydroxyl groups, carboxylic acids to more reduced carboxylic acids, carboxylic acids to aldehydes and/or aldehydes to alcohols. Some embodiments generally relate to hydrodimerization of carbonyl compounds. The methods generally include electrochemically and/or photoelectrochemically reducing in an aqueous, electrolyte-supported divided electrochemical cell that includes an anode (e.g., an inert conductive counter electrode) in a cell compartment and a conductive or p-type semiconductor working cathode electrode in another cell compartment. A catalyst may be included to help produce a reduced product. The reactants may be continuously introduced into the cathode electrolyte solution to saturate the solution.

For electrochemical reductions, the electrode may be a suitable conductive electrode, such as Al, Au, Ag, C, Cd, Co, Cr, Cu, Cu alloys (e.g., brass and bronze), Ga, Hg, In, Mo, Nb, Ni, Ni alloys, Ni—Fe alloys, Sn, Sn alloys, Ti, V, W, Zn, stainless steel (SS), austenitic steel, ferritic steel, duplex steel martensitic steel, Nichrome, elgiloy (e.g., Co—Ni—Cr), degenerately doped p-Si, degenerately doped p-Si:As and degenerately doped p-Si:B. Other conductive electrodes may be implemented to meet the criteria of a particular application. For photoelectrochemical reductions, the electrode may be a p-type semiconductor, such as p-GaAs, p-GaP, p-InN, p-InP, p-CdTe, p-GaInP$_2$ and p-Si. Other semiconductor electrodes may be implemented to meet the criteria of a particular application.

Before any embodiments of the invention are explained in detail, it is to be understood that the embodiments may not be limited in application per the details of the structure or the function as set forth in the following descriptions or illustrated in the figures of the drawing. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage.

In the following description of methods, process steps may be carried out over a range of temperatures (e.g., approximately 10° C. (Celsius) to 50° C.) and a range of pressures (e.g., approximately 1 to 10 atmospheres) unless otherwise specified. Numerical ranges recited herein generally include all values from the lower value to the upper value (e.g., all possible combinations of numerical values between the lowest value and the highest value enumerated are considered expressly stated). For example, if a concentration range or beneficial effect range is stated as 1% to 50%, it is intended that values such as 2% to 40%, 10% to 30%, or 1% to 3%, etc., are expressly enumerated. The above may be simple examples of what is specifically intended.

Referring to FIG. 1, a block diagram of a system 100 is shown in accordance with a preferred embodiment of the present invention. The system (or apparatus) 100 generally comprises a cell (or container) 102, a liquid source 104, a power source 106, a reactant source 108, an extractor 110 and an extractor 112. A product may be presented from the extractor 110. An output gas may be presented from the extractor 112. Another output gas may be presented from the cell 102.

The cell 102 may be implemented as a divided cell. The divided cell may be a divided electrochemical cell and/or a divided photochemical cell. The cell 102 is generally operational to reduce carbonyl compounds and/or carboxyl group compounds (e.g., reactants) to aldehyde, alcohols, hydroxyl groups and/or organic products containing keto groups. The reactants may also be reduced to methanol, ethanol, propanol, pentanol, hexanol and heptanol. The cell 102 may also be operational to hydrodimerize carbonyl compounds to butanone (methyl ethyl ketone), butanol, octanone and/or octanol. The carbonyl compounds may include, but are not limited to, aldehydes and carboxylic acids. The reactions generally takes place by introducing the reactants into an aqueous solution of an electrolyte in the cell 102. A cathode in the cell 102 may hydrodimerize and/or reduce the reactants into one or more organic compounds.

The cell 102 generally comprises two or more compartments (or chambers) 114a-114b, a separator (or membrane) 116, an anode 118 and a cathode 120. The anode 118 may be disposed in a given compartment (e.g., 114a). The cathode 120 may be disposed in another compartment (e.g., 114b) on an opposite side of the separator 116 as the anode 118. An aqueous solution 122 may fill both compartments 114a-114b. A catalyst 124 may be added to the compartment 114b containing the cathode 120.

The liquid source 104 may implement a water source. The liquid source 104 may be operational to provide pure water to the cell 102.

The power source 106 may implement a variable voltage source. The source 106 may be operational to generate an electrical potential between the anode 118 and the cathode 120. The electrical potential may be a DC voltage.

The reactant source 108 may implement a keto group, carbonyl compound, carboxyl group compound and/or aldehyde source. The source 108 is generally operational to provide the reactants to the cell 102. In some embodiments, the reactants are introduced directly into the compartment 114b containing the cathode 120.

The extractor 110 may implement an organic product extractor. The extractor 110 is generally operational to extract (separate) organic products (e.g., acetaldehyde, acetone, butanone, 2-butanol, n-butanol, ethanol, glyoxal, glyoxylic acid, methanol, octanone, octanol, oxalic acid, propanol, propioin and the like) from the electrolyte 122. The extracted organic products may be presented through a port 126 of the system 100 for subsequent storage and/or consumption by other devices and/or processes.

The extractor 112 may implement an oxygen extractor. The extractor 112 is generally operational to extract oxygen (e.g., $O_2$) byproducts created by the reactions. The extracted oxygen may be presented through a port 128 of the system 100 for subsequent storage and/or consumption by other devices and/or processes. Any other excess gases (e.g., hydrogen) created by the reactions may be vented from the cell 102 via a port 130.

In the process described, water may be oxidized (or split) to protons and oxygen at the anode 118 while organic molecules containing a carbonyl or carboxyl group are hydrodimerized and sometimes reduced at the cathode 120. The electrolyte 122 in the cell 102 may use water as a solvent with any salts that are water soluble and with a heterocycle catalyst 124. The catalysts 124 may include, but are not limited to, azoles, imidazoles, indoles, pyridine, pyrrole, thiazole and furan. Examples of the heterocyclic compounds catalysts 124 may be pyridine, imidazole, pyrrole, thiazole, furan, thiophene and the substituted heterocycles such as amino-thiazole and benzimidazole. Cathode materials generally include any conductor. Any anode material may be used. The overall process is generally driven by the power source 106. Combinations of cathodes 120, electrolytes 122, introduction of the carbonyl or carboxyl group to the cell 102, pH levels and electric potential from the power source 106 may be used to control the reaction products of the cell 102. Organic products resulting from the reactions may include, but are not limited to, alcohols, aldehydes, organic molecules containing hydroxyl groups and/or organic products containing keto groups.

In some nonaqueous embodiments, the solvent may include methanol, acetonitrile, and/or other nonaqueous solvents. The electrolytes generally include tetraalkyl ammonium salts and a heterocyclic catalyst. In a system containing nonaqueous catholyte and aqueous anolyte, the products generally include all of the products seen in aqueous systems with higher yields.

Experiments were conducted in one, two and three-compartment electrochemical cells 102 with a platinum anode 118 and Saturated Calomel Electrode (SCE) as the reference electrode. The experiments were generally conducted at ambient temperature and pressure. Reactants were introduced into the cells during the experiments. A potentiostat or DC power supply 106 provides the electrical energy to drive the process. Cell potentials ranged from 1.5 volts to 4 volts, depending on the cathode material. Half cell potentials at the cathode ranged from −1 volt to −2 volts relative to the SCE, depending on the cathode material used. Products from the experiments were analyzed using gas chromatography and a spectrometer.

Figure 2:
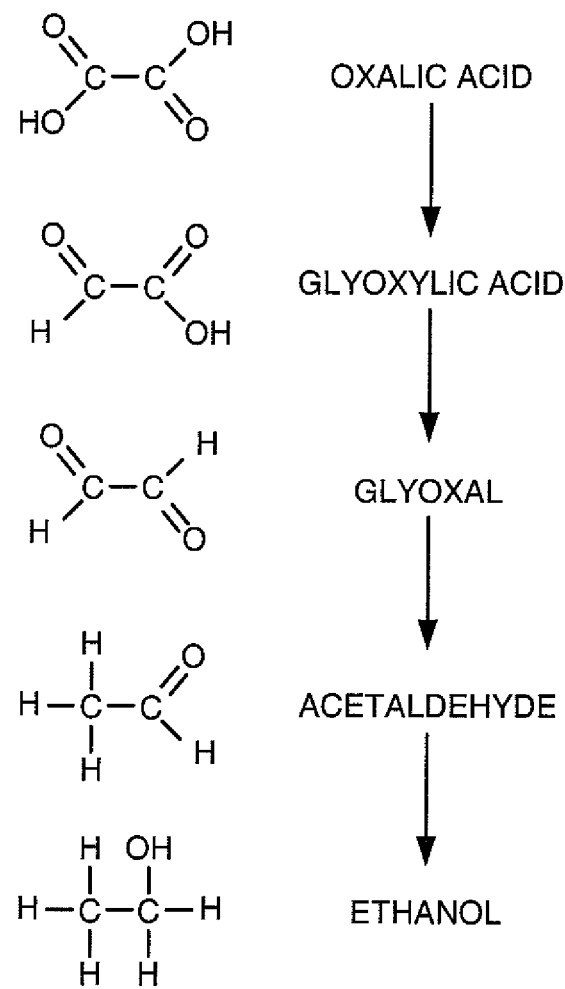
FIG. 2 is a diagram illustrating reductions of two-carbon and higher starting materials.

Referring to FIG. 2, a diagram illustrating reductions of two-carbon and higher starting materials is shown. Complex molecules, such as oxalic acid (a carboxylic acid) may be reduced to a simpler glyoxylic acid (a C2 carboxylic acid). The glyoxylic acid may be further reduced to glyoxal (a dialdehyde). Furthermore, the glyoxal may be reduced to acetaldehyde (an aldehyde). The acetaldehyde is generally reducible to ethanol (a primary alcohol). Other aldehydes may include, but are not limited to, formaldehyde, butanal and benzaldehyde. Other alcohols may include, but are not limited to, methanol, 2-butanol, n-butanol, propanol, and propioin. The process is controlled to get a desired product by using combinations of specific conductive cathodes, catalysts, electrolytes, surface morphology of the electrodes, pH levels and/or introduction of reactants relative to the cathode. Faradaic yields for the products generally range from less than 1% to more than 90% with the remainder generally being hydrogen.

Referring to FIG. 3, formulae of example hydrodimerization reactions are shown. Formula (1) generally illustrates a hydrodimerization of two acetaldehyde molecules (e.g., $C_2H_4O$) into a butanone molecule (e.g., $C_4H_8O$) and half of an oxygen (e.g., $O_2$) molecule. Formula (2) may illustrate a hydrodimerization of two acetaldehyde molecules and two hydrogen ions (e.g., $H^+$) into a butanol molecule (e.g., $C_4H_9OH$) and half of an oxygen molecule. Formula (3) may show a hydrodimerization of two butyric acid molecules (e.g., $C_4H_8O_2$) and two hydrogen ions into an octanol molecule (e.g., $C_8H_{18}O$) and one and a half oxygen molecules. Formula (4) generally illustrates a hydrodimerization of two butyric acid molecules into a 2-octanone molecule (e.g., $C_8H_{16}O$) and one and a half oxygen molecules.

Referring to FIG. 4, a table illustrating relative product yields for different cathode material, catalyst and cathode potential combinations are shown. Lower pH generally favors reduction of a carbonyl group without dimerization, for instance, the reduction of formic acid to methanol. Aldehydes may be more likely to reduce to alcohols without dimerization. Carboxylic acids and dialdehydes may be more likely to dimerize, with the exception of formic acid. Faradaic yields generally improve with more negative cathodic potential, particularly for dimerization. Any N-containing heterocycle may be used as a catalyst. 4,4' bipyridine was generally found to be an effective catalyst. Conversion rates generally improve with catalyst concentrations in excess of 50 millimolar (mM).

Figure 5:
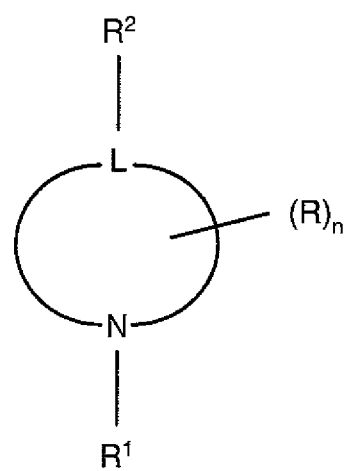
FIG. 5 is a formula of an aromatic heterocyclic amine catalyst.

Referring to FIG. 5, a formula of an aromatic heterocyclic amine catalyst is shown. The ring structure may be an aromatic 5-member heterocyclic ring or 6-member heterocyclic ring with at least one ring nitrogen and is optionally substituted at one or more ring positions other than nitrogen with R. L may be C or N. R1 may be H. R2 may be H if L is N or R2 is R if L is C. R is an optional substituent on any ring carbon and may be independently selected from H, a straight chain or branched chain lower alkyl, hydroxyl, amino, pyridyl, or two R's taken together with the ring carbons bonded thereto are a fused six-member aryl ring and n=0 to 4.

Figure 6:
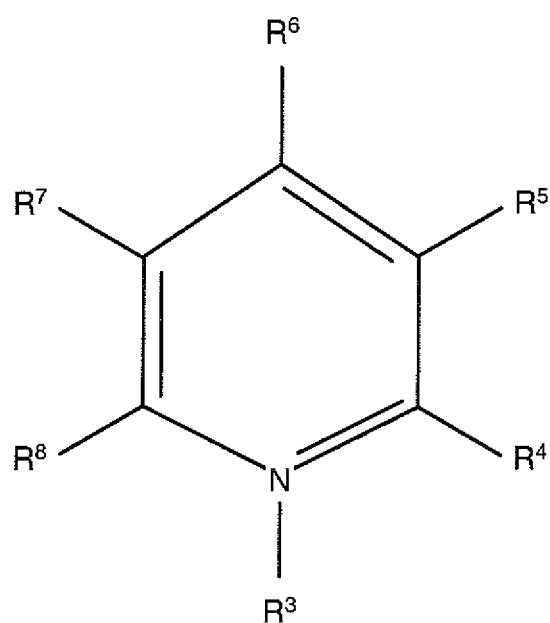
FIGS. 6-8 are formulae of substituted or unsubstituted aromatic 5-member heterocyclic amines or 6-member heterocyclic amines.
Figure 7:
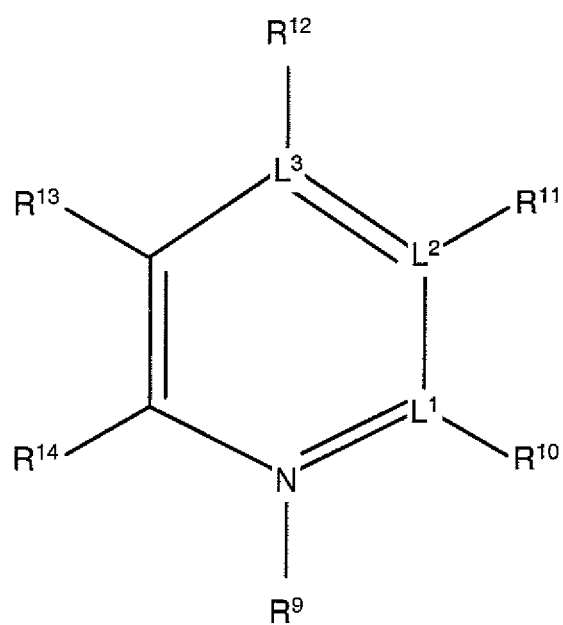
Figure 8:
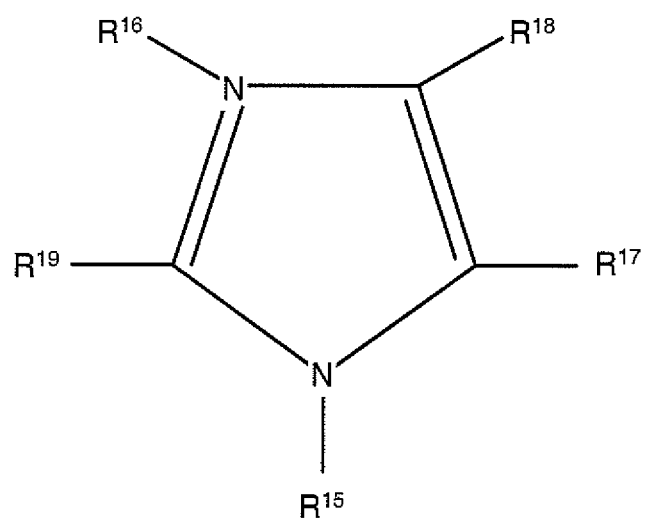

Referring to FIGS. 6-8, formulae of substituted or unsubstituted aromatic 5-member heterocyclic amines or 6-member heterocyclic amines are shown. Referring to FIG. 6, R3 may be H. R4, R5, R7 and R8 are generally independently H, straight chain or branched chain lower alkyl, hydroxyl, amino, or taken together are a fused six-member aryl ring. R6 may be H, straight chain or branched chain lower alkyl, hydroxyl, amino or pyridyl.

Referring to FIG. 7, one of L1, L2 and L3 may be N, while the other L's may be C. R9 may be H. If L1 is N, R10 may be H. If L2 is N, R11 may be H. If L3 is N, R12 may be H. If L1, L2 or L3 is C, then R10, R11, R12, R13 and R14 may be independently selected from straight chain or branched chain lower alkyl, hydroxyl, amino, or pyridyl.

Referring to FIG. 8, R15 and R16 may be H. R17, R18 and R19 are generally independently selected from straight chain or branched chain lower alkyl, hydroxyl, amino, or pyridyl.

Suitably, the concentration of aromatic heterocyclic amine catalysts is about 10 mM to 1 M. Concentrations of the electrolyte may be about 0.1 M to 1 M. The electrolyte may be suitably a salt, such as KCl, $NaNO_3$, $Na_2SO_4$, NaCl, NaF, $NaClO_4$, $KClO_4$, $K_2SiO_3$, or $CaCl_2$ at a concentration of about 0.5 M. Other electrolytes may include, but are not limited to, all group 1 cations (e.g., H, Li, Na, K, Rb and Cs) except Francium (Fr), Ca, ammonium cations, alkylammonium cations and alkyl amines. Additional electrolytes may include, but are not limited to, all group 17 anions (e.g., F, Cl, Br, I and At), borates, carbonates, nitrates, nitrites, perchlorates, phosphates, polyphosphates, silicates and sulfates. Na generally performs as well as K with regard to best practices, so NaCl may be exchanged with KCl. NaF may perform about as well as NaCl, so NaF may be exchanged for NaCl or KCl in many cases. Larger anions tend to change the chemistry and favor different products. For instance, sulfate may favor polymer or methanol production while Cl may favor products such as acetone. The pH of the solution is generally maintained at about pH 3 to 8, suitably about 4.7 to 5.6.

Some embodiments of the present invention may be further explained by the following examples, which should not be construed by way of limiting the scope of the invention.

EXAMPLE 1

General Electrochemical Methods

Chemicals and materials. All chemicals used were >98% purity and used as received from the vendor (e.g., Aldrich), without further purification. Either deionized or high purity water (Nanopure, Barnstead) was used to prepare the aqueous electrolyte solutions.

Electrochemical system. The electrochemical system was composed of a standard two-compartment electrolysis cell 102 to separate the anode 118 and cathode 120 reactions. The compartments were separated by a porous glass frit or other ion conducting bridge 116. A 0.5 M KCl (Electro Migration Dispersion (EMD)>99%) was generally used as the supporting electrolyte 122. A concentration of the desired aromatic heterocyclic amine, such as pyridine, pyridine derivatives, bipyridine, imidazole and imidazole derivatives, of between about 1 mM to 1 M was used.

Figure 9:
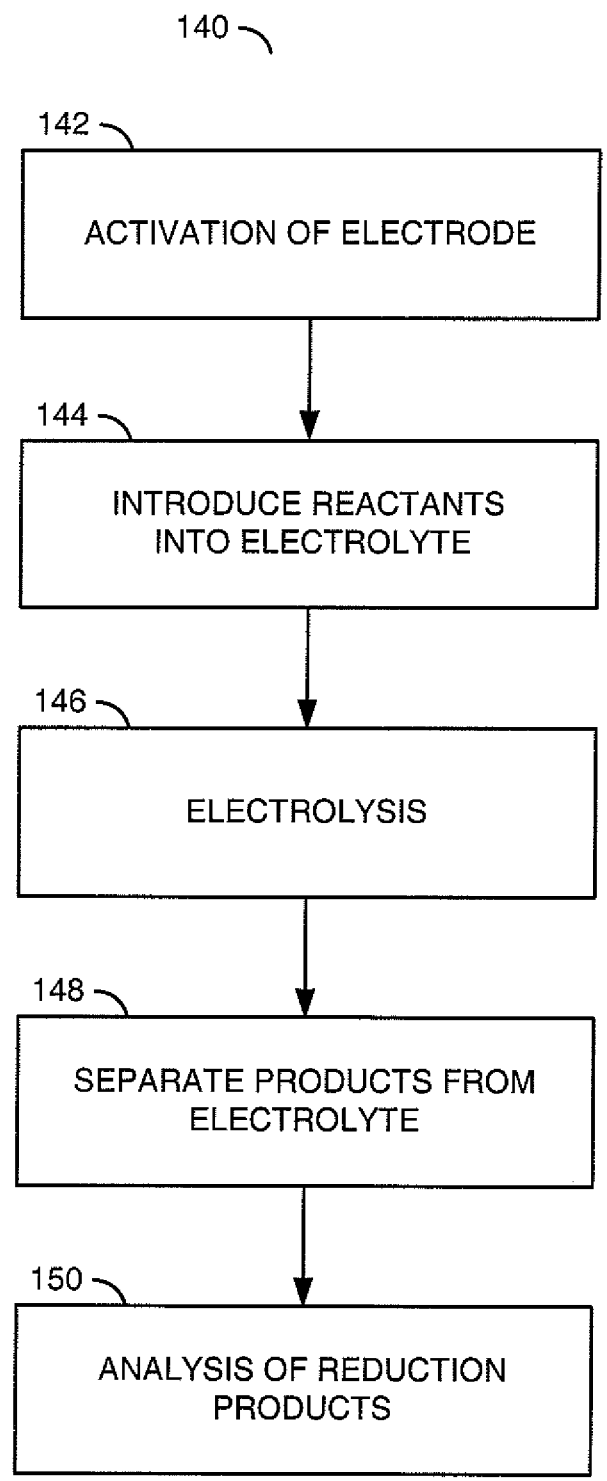
FIG. 9 is a flow diagram of an example method used in electrochemical examples.

Referring to FIG. 9, a flow diagram of an example method 140 used in the electrochemical examples is shown. The method (or process) 140 generally comprises a step (or block) 142, a step (or block) 144, a step (or block) 146, a step (or block) 148 and a step (or block) 150. The method 140 may be implemented using the system 100.

In the step 142, the electrodes 118 and 120 may be activated where appropriate. Introduction of the reactants into the cell 102 may be performed in the step 144. Electrolysis of the reactants into organic products may occur during step 146. In the step 148, the organic products may be separated from the electrolyte. Analysis of the reduction products may be performed in the step 150.

The working electrode was a steel electrode of a known area. Before and during all electrolysis, the reactants were continuously introduced into the electrolyte to saturate the solution. The resulting pH of the solution was maintained at about pH 3 to pH 8.

EXAMPLE 2

General Photoelectrochemical Methods

Chemicals and materials. All chemicals used were analytical grade or higher. Either deionized or high purity water (Nanopure, Barnstead) was used to prepare the aqueous electrolyte solutions.

Photoelectrochemical system. The photoelectrochemical system was composed of a Pyrex three-necked flask containing 0.5 M KCl as supporting electrolyte and a 1 mM to 1 M catalyst (e.g., 10 mM pyridine or pyridine derivative). The photocathode was a single crystal p-type semiconductor etched for approximately 1 to 2 minutes in a bath of concentrated $HNO_3$:HCl, 2:1 v/v prior to use. An ohmic contact was made to the back of the freshly etched crystal using an indium/zinc (2 wt. % Zn) solder. The contact was connected to an external lead with conducting silver epoxy (Epoxy Technology H31) covered in glass tubing and insulated using an epoxy cement (Loctite 0151 Hysol) to expose only the front face of the semiconductor to solution. All potentials were referenced against a saturated calomel electrode (Accumet). During all electrolysis, the reactants were continuously introduced to the electrolyte to saturate the solution. The resulting pH of the solution was maintained at about pH 3 to 8 (e.g., pH 5.2).

Figure 10:
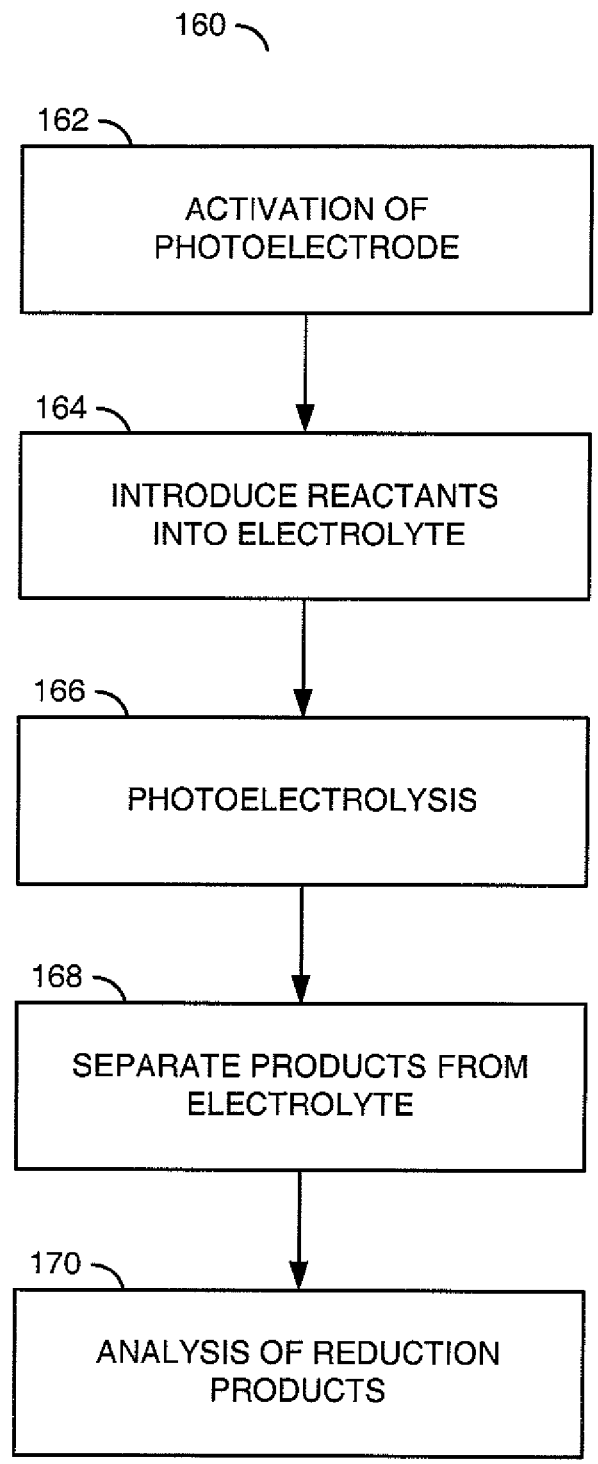
FIG. 10 is a flow diagram of an example method used in photochemical examples.

Referring to FIG. 10, a flow diagram of an example method 160 used in the photochemical examples is shown. The method (or process) 160 generally comprises a step (or block) 162, a step (or block) 164, a step (or block) 166, a step (or block) 168 and a step (or block) 170. The method 160 may be implemented using the system 100.

In the step 162, the photoelectrode may be activated. Introduction of the reactants into the cell 102 may be performed in the step 164. Electrolysis of the reactants into organic products may occur during step 166. In the step 168, the organic products may be separated from the electrolyte. Analysis of the reduction products may be performed in the step 170.

Light sources. Four different light sources were used for the illumination of the p-type semiconductor electrode. For initial electrolysis experiments, a Hg—Xe arc lamp (USHIO UXM 200H) was used in a lamp housing (PTI Model A-1010) and powered by a PTI LTS-200 power supply. Similarly, a Xe arc lamp (USHIO UXL 151H) was used in the same housing in conjunction with a PTI monochromator to illuminate the electrode at various specific wavelengths.

A fiber optic spectrometer (Ocean Optics S2000) or a silicon photodetector (Newport 818-SL silicon detector) was used to measure the relative resulting power emitted through the monochromator. The flatband potential was obtained by measurements of the open circuit photovoltage during various irradiation intensities using the 200 watt (W) Hg—Xe lamp (3 $W/cm^2$-23 $W/cm^2$). The photovoltage was observed to saturate at intensities above approximately 6 $W/cm^2$.

For quantum yield determinations, electrolysis was performed under illumination by two different light-emitting diodes (LEDs). A blue LED (Luxeon V Dental Blue, Future Electronics) with a luminous output of 500 milliwatt (mW)+/−50 mW at 465 nanometers (nm) and a 20 nm full width at half maximum (FWHM) was driven at to a maximum rated current of 700 mA using a Xitanium Driver (Advance Transformer Company). A Fraen collimating lens (Future Electronics) was used to direct the output light. The resultant power density that reached the window of the photoelectrochemical cell was determined to be 42 $mW/cm^2$, measured using a Scientech 364 thermopile power meter and silicon photodetector. The measured power density was assumed to be greater than the actual power density observed at the semiconductor face due to luminous intensity loss through the solution layer between the wall of the photoelectrochemical cell and the electrode.

EXAMPLE 3

Analysis of Products of Electrolysis

Electrochemical experiments were generally performed using a CH Instruments potentiostat or a DC power supply with current logger to run bulk electrolysis experiments. The CH Instruments potentiostat was generally used for cyclic voltammetry. Electrolysis was run under potentiostatic conditions from approximately 6 hours to 30 hours until a relatively similar amount of charge was passed for each run.

Gas Chromatography. The electrolysis samples were analyzed using a gas chromatograph (HP 5890 GC) equipped with a FID detection. Removal of the supporting electrolyte salt was first achieved with an Amberlite IRN-150 ion exchange resin (cleaned prior to use to ensure no organic artifacts by stirring in a 0.1% v/v aqueous solution of Triton X-100, reduced (Aldrich), filtered and rinsed with a copious amount of water, and vacuum dried below the maximum temperature of the resin (approximately 60° C.) before the sample was directly injected into the GC which housed a DB-Wax column (Agilent Technologies, 60 m, 1 micrometer (μm) film thickness). Approximately 1 gram of resin was used to remove the salt from 1 milliliter (mL) of the sample. The injector temperature was held at 200° C., the oven temperature maintained at 120° C., and the detector temperature at 200° C.

Spectrophotometry. The presence of formaldehyde was also determined by the chromotropic acid assay. Briefly, a solution of 0.3 g of 4,5-dihydroxynaphthalene-2,7-disulfonic acid, disodium salt dihydrate (Aldrich) was dissolved in 10 mL deionized water before diluting to 100 mL with concentrated sulfuric acid. For formaldehyde, an aliquot of 1.5 mL was then added to 0.5 mL of the sample. The presence of formaldehyde (absorbency at 577 nm) was detected against a standard curve using an HP 8453 UV-Vis spectrometer. For formic acid, a 0.5 mL aliquot of sample was first reduced with an approximately 100 mg piece of Mg wire and 0.5 mL concentrated hydrochloric acid (added slowly in aliquots over a 10 minute period) to convert to formaldehyde before following the chromotropic acid assay as described above.

Nuclear Magnetic Resonance. NMR spectra of electrolyte volumes after bulk electrolysis were also obtained using an automated Bruker Ultrashield™ 500 Plus spectrometer with an excitation sculpting pulse technique for water suppression. Data processing was achieved using MestReNova software.

Selective hydrodimerization of carbonyl-containing organic molecules, such as aldehydes and carboxylic acids, may be performed in the cell 102. For instance, some two-carbon molecules such as an acetaldehyde may be hydrodimerized into butanone (methyl ethyl ketone) or butanol. Similarly, a carboxylic acid such as butyric acid may be hydrodimerized to octanone or octanol.

Selective reduction of carboxylic acids to aldehydes and/or alcohols and the reduction of aldehydes to alcohols may also be performed in the cell 102. Other carbonyl groups, such as ketones, may also be reduced to hydroxyl groups. The selectivity of the process generally maximizes efficiency and ease of product extraction relative to existing processes used for organic chemical production. Some embodiments do not operate at high temperatures, high pressures or high acidity. Biologically-produced chemicals with carbonyl groups may be converted to environmentally-friendly alcohol fuels, thereby reducing greenhouse gas emissions. Conversion of small molecules to longer-chain molecules, generally reduces the costs of upgrading small molecules into high value products. A variety of C2, C4, C6, C8 organic molecules may be produced.

Some embodiments of the present invention generally provide for new cathode materials and new electrolyte materials. Specific combinations of the cathode materials, the electrolytes and the catalysts may be used to get a desired organic product. Process conditions may be controlled to maximize conversion efficiency and selectivity. Cell parameters may be selected to minimize unproductive side reactions like $H_2$ evolution from water electrolysis. Choice of specific configurations of heterocyclic amine catalysts with engineered functional groups may be utilized in the system 100 to achieve high faradaic rates. Process conditions described above may facilitate long life (e.g., improved stability), electrode and cell cycling and product recovery.

Cathode, catalyst and electrolyte combinations may be used to selectively electrohydrodimerize carbonyl-containing compounds to a variety of valuable organic chemicals. The cathode, catalyst and electrolyte combinations may also be used to selectively reduce carbonyl groups, including aldehydes, to alcohols and carboxylic acids to aldehydes and/or alcohols. The relative low cost and abundance of the combinations disclosed above generally opens the possibility of commercialization. The processes described may operate at atmospheric pressure, ambient temperature, uses water as a solvent and features mild pH (e.g., generally greater than pH 4). The features generally mean that abundant, low-cost materials may be used to build plants incorporating some embodiments of the present invention. Furthermore, the process may be stable over time.

In an electrochemical system with fixed cathodes, the electrolyte and/or catalyst may be altered to change the organic product mix. The cathodes may be swapped out in a modular electrochemical system to change the organic product mix. In a hybrid photoelectrochemical system, the cathode or anode may be a photovoltaic material. Plant operating in conjunction with biological production of simple carbonyl-containing chemicals such as acetaldehyde, lactic acid, citric acid, etc. may include the system 100 to covert the chemicals into other useful organic compounds. Biologically produced chemicals may be converted into longer chain chemicals and products such fuels, solvents and the like.

While the invention has been particularly shown and described with reference to the preferred embodiments thereof, it will be understood by those skilled in the art that various changes in form and details may be made without departing from the scope of the invention.

The invention claimed is:

1. A method for heterocycle catalyzed electrochemical reduction of a carboxylic acid, comprising the steps of:
   (A) introducing said carboxylic acid into a nonaqueous solution of an electrolyte, a nonaqueous solvent and an aromatic heterocyclic amine catalyst in a divided electrochemical cell, wherein said divided electrochemical cell comprises an anode in a first cell compartment and a cathode in a second cell compartment;
   (B) applying an electrical potential between the anode and the cathode of the divided electrochemical cell sufficient to reduce said carboxylic acid to at least one aldehyde compound; and
   (C) separating said at least one aldehyde compound from said nonaqueous solution.

2. The method according to claim 1, wherein said cathode material is at least one of Al, Au, C, Co, Cr, Cu, Cu alloys, Ga, In, Mo, Nb, Ni, Ni alloys, Ni—Fe alloys, Ti, V, W, Zn, elgiloy, Nichrome, austenitic steel, duplex steel, ferritic steel, martensitic steel, stainless steel, degenerately doped p-Si, degenerately doped p-Si:As and degenerately doped p-Si:B.

3. The method according to claim 1, wherein said electrolyte is at least one of $Na_2SO_4$, KCl, $NaNO_3$, NaCl, NaF, $NaClO_4$, $KClO_4$, $K_2SiO_3$, $CaCl_2$, a H cation, a Li cation, a Na cation, a K cation, a Rb cation, a Cs cation, a Ca cation, an ammonium cation, an alkylammonium cation, a F anion, a Cl anion, a Br anion, an I anion, an At anion, an alkyl amine, borates, carbonates, nitrites, nitrates, phosphates, polyphosphates, perchlorates, silicates, sulfates, and a tetraalkyl ammonium salt.

4. The method according to claim 1, wherein said aromatic heterocyclic amine catalyst is one or more of amino-thiazole, aromatic heterocyclic amines with an aromatic 5-member heterocyclic ring, aromatic heterocyclic amines with 6-member heterocyclic ring, azoles, benzimidazole, bipyridines, furan, imidazoles, imidazole related species with at least one five-member ring, indoles, pyridines, pyridine related species with at least one six-member ring, pyrrole, thiophene and thiazoles.

5. The method according to claim 1, wherein the nonaqueous solution has a pH level from approximately 3 to approximately 8.

6. The method according to claim 5, wherein the pH level ranges from approximately 4.7 to 5.6.

7. The method according to claim 1, wherein said electrical potential ranges from approximately −1 volt to approximately −2 volts.

8. The method according to claim 1, wherein the aromatic heterocyclic amine catalyst has a concentration of about 10 mM to 1 M.

9. The method according to claim 1, wherein the electrolyte has a concentration of about 0.1 M to 1 M.

10. The method according to claim 1, wherein the aromatic heterocyclic amine catalyst is 4,4'-bipyridine with a concentration is greater than 50 millimolar (mM).

11. The method according to claim 1, wherein the nonaqueous solvent includes at least one of methanol or acetonitrile.

* * * * *

UNITED STATES PATENT AND TRADEMARK OFFICE
CERTIFICATE OF CORRECTION

| | | |
|---|---|---|
| PATENT NO. | : 8,845,877 B2 | Page 1 of 1 |
| APPLICATION NO. | : 12/846011 | |
| DATED | : September 30, 2014 | |
| INVENTOR(S) | : Cole et al. | |

It is certified that error appears in the above-identified patent and that said Letters Patent is hereby corrected as shown below:

In the specification

Column 1, line 12, insert

--RIGHTS IN THE UNITED STATES GOVERNMENT
   This invention was made with government support under Grant No. CHE-0911114 awarded by the National Science Foundation. The government has certain rights in this invention.--

Signed and Sealed this
Seventh Day of June, 2016

Michelle K. Lee
*Director of the United States Patent and Trademark Office*